US012111818B2

(12) United States Patent
Rise

(10) Patent No.: US 12,111,818 B2
(45) Date of Patent: Oct. 8, 2024

(54) COMPARING ORDERED SETS GENERATED BY DIFFERENT DATA-PROCESSING ENGINES

(71) Applicant: Microsoft Technology Licensing, LLC, Redmond, WA (US)

(72) Inventor: Peter Joseph Rise, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/080,484

(22) Filed: Dec. 13, 2022

(65) Prior Publication Data

US 2024/0193150 A1    Jun. 13, 2024

(51) Int. Cl.
*G06F 7/00* (2006.01)
*G01C 21/00* (2006.01)
*G01C 21/34* (2006.01)
*G06F 16/23* (2019.01)
*G06F 16/2457* (2019.01)
*G06F 16/29* (2019.01)
*G06F 17/00* (2019.01)

(52) U.S. Cl.
CPC ..... *G06F 16/2365* (2019.01); *G01C 21/3415* (2013.01); *G01C 21/3811* (2020.08); *G01C 21/3815* (2020.08); *G01C 21/3859* (2020.08); *G06F 16/24578* (2019.01); *G06F 16/29* (2019.01)

(58) Field of Classification Search
None
See application file for complete search history.

(56) References Cited

U.S. PATENT DOCUMENTS

| | | | | |
|---|---|---|---|---|
| 2014/0108369 A1* | 4/2014 | Nijer | ...................... | G06F 16/23 707/706 |
| 2016/0055503 A1* | 2/2016 | Chan | .................. | G06Q 30/0205 705/7.34 |
| 2019/0034541 A1* | 1/2019 | Bosarge | ................ | G06F 16/951 |

OTHER PUBLICATIONS

"Ramer-Douglas-Peucker algorithm," https://en.wikipedia.org/wiki/Ramer-Douglas-Peucker_algorithm, Wikipedia article, retrieved on Nov. 17, 2022, 5 pages.

(Continued)

*Primary Examiner* — Tuan A Pham

(57) ABSTRACT

A technique updates a first data-processing engine based on reference information produced by a second data-processing engine. The technique involves obtaining ordered sets of result items from both engines, where the result items produced by the second engine serve the role of the reference information. The technique then produces accuracy information by assessing the accuracy of the first-set result items relative to the second-set result items. The accuracy information is a set-wide assessment that reflects how well the first-set result items match the second-set result items, taking into account the similarity between pairs of result items and the ordering of result items in the ordered sets. The technique then modifies a configuration of the first data-processing engine based on the accuracy information to improve its quality. In some implementations, the first and second data-processing engines are first and second map engines that generate routes through a physical space.

19 Claims, 12 Drawing Sheets

(56) References Cited

OTHER PUBLICATIONS

Douglas, et al., "Algorithms for the Reduction of the Number of Points Required to Represent a Digitized Line or its Caricature," in The Canadian Cartographer, vol. 10, No. 2, 1973, pp. 112-122.

"Fréchet distance," https://en.wikipedia.org/wiki/Fréchet_distance, Wikipedia article, accessed on Nov. 11, 2022, 5 pages.

Alt, et al., "Computing the Fréchet Distance Between Two Polygonal Curves," in International Journal of Computational Geometry and Applications, vol. 5, Nos. 1-2, 1995, pp. 75-91.

"Discounted cumulative gain," available at https://en.wikipedia.org/wiki/Discounted_cumulative_gain, Wikipedia article, accessed on Nov. 11, 2022, 6 pages.

Toohey, et al., "Trajectory Similarity Measures," in SIGSPATIAL, vol. 7, No. 1, Mar. 2015, pp. 43-50.

"Total order," available at https://en.wikipedia.org/wiki/Total_order, Wikipedia article, accessed on Dec. 13, 2022, 9 pages.

Eiter, et al., "Computing Discrete Fréchet Distance," available at http://www.kr.tuwien.ac.at/staff/eiter/et-archive/cdtr9464.pdf, CD-TR 94/64, Information Systems Department, Technical University of Vienna, 1994, 8 pages.

"Introduction to Lattices and Order," available at https://en.wikipedia.org/wiki/Introduction_to_Lattices_and_Order, Wikipedia article, accessed on May 19, 2023, 2 pages.

Järvelin, et al., "Cumulated Gain-Based Evaluation of IR Techniques," in ACM Transactions on Information Systems, vol. 20, Issue 4, pp. 422-446.

Radlinski, et al., "Comparing the Sensitivity of Information Retrieval Metrics," in SIGIR '10: Proceedings of the 33rd International ACM SIGIR Conference on Research and Development in Information Retrieval, Jul. 2010, pp. 667-674.

Hapelle, et al., "Expected Reciprocal Rank for Graded Relevance," in CIKM '09: Proceedings of the 18th ACM Conference on Information and knowledge Management, Nov. 2009, pp. 621-630.

* cited by examiner

FIRST EXAMPLE: $n_{Exp} = 3$, $n_{Ref} = 3$

| $i$ | FIRST-SET RESULT ITEM (E.G., ROUTE) | ACTUAL REFERENCE MATCH $j$ | ACTUAL RELEVANCE $rel_i$ | ACTUAL DISCOUNTED RELEVANCE $rel_i$ |
|---|---|---|---|---|
| 0 | 0 | 1 | 2 | 2.00 |
| 1 | 1 | 0 | 3 | 1.89 |
| 2 | 2 | 2 | 1 | 0.50 |

| $i$ | FIRST-SET RESULT ITEM (E.G., ROUTE) | IDEAL REFERENCE MATCH $j$ | IDEAL RELEVANCE $Rel_i$ | IDEAL DISCOUNTED RELEVANCE $Rel_i$ |
|---|---|---|---|---|
| 0 | 0 | 0 | 3 | 3.00 |
| 1 | 1 | 1 | 2 | 1.26 |
| 2 | 2 | 2 | 1 | 0.50 |

SECOND EXAMPLE: $n_{Exp} = 2$, $n_{Ref} = 3$

| $i$ | FIRST-SET RESULT ITEM (E.G., ROUTE) | ACTUAL REFERENCE MATCH $j$ | ACTUAL RELEVANCE $rel_i$ | ACTUAL DISCOUNTED RELEVANCE $rel_i$ |
|---|---|---|---|---|
| 0 | 0 | 0 | 3 | 3.00 |
| 1 | 1 | 2 | 1 | 0.63 |
| 2 | 2 | (none) | 0 | 0.00 |

| $i$ | FIRST-SET RESULT ITEM (E.G., ROUTE) | IDEAL REFERENCE MATCH $j$ | IDEAL RELEVANCE $Rel_i$ | IDEAL DISCOUNTED RELEVANCE $Rel_i$ |
|---|---|---|---|---|
| 0 | 0 | 0 | 3 | 3.00 |
| 1 | 1 | 1 | 2 | 1.26 |
| 2 | 2 | 2 | 1 | 0.50 |

RELEVANCE = 3

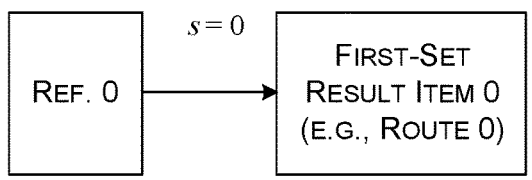

RELEVANCE = 3

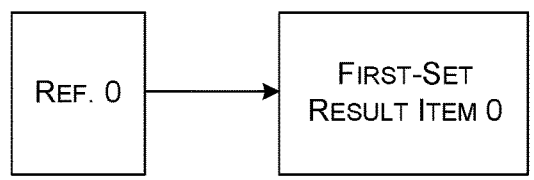

RELEVANCE = 2

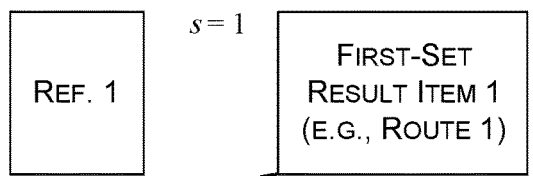

RELEVANCE = 2

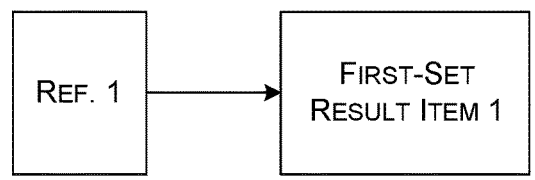

RELEVANCE = 1

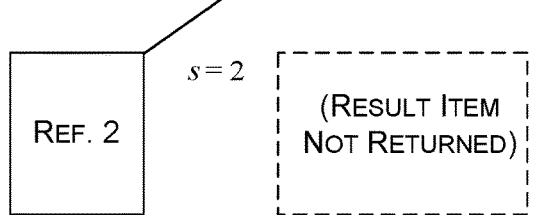

RELEVANCE = 1

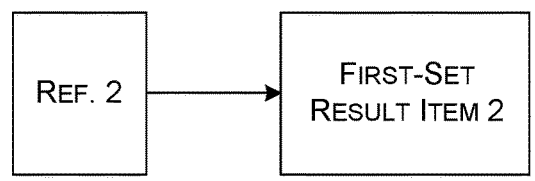

ACTUAL MATCHES          IDEAL MATCHES

FIG. 7

THIRD EXAMPLE: $n_{Exp} = 3, n_{Ref} = 2$

| $i$ | FIRST-SET RESULT ITEM (E.G., ROUTE) | ACTUAL REFERENCE MATCH $j$ | ACTUAL RELEVANCE $rel_i$ | ACTUAL DISCOUNTED RELEVANCE $rel_i$ |
|---|---|---|---|---|
| 0 | 0 | 0 | 2 | 2.00 |
| 1 | 1 | 1 | 1 | 0.63 |
| N/A | 2 | (Similarity Only) | N/A | N/A |

| $i$ | FIRST-SET RESULT ITEM (E.G., ROUTE) | IDEAL REFERENCE MATCH $j$ | IDEAL RELEVANCE $Rel_i$ | IDEAL DISCOUNTED RELEVANCE $Rel_i$ |
|---|---|---|---|---|
| 0 | 0 | 0 | 2 | 2.00 |
| 1 | 1 | 1 | 1 | 0.63 |

RELEVANCE = 3

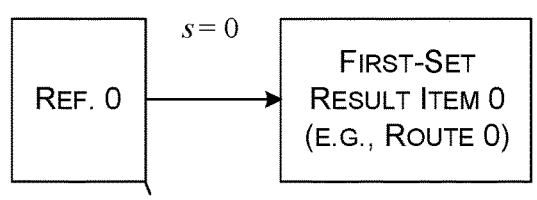

REL. = 2

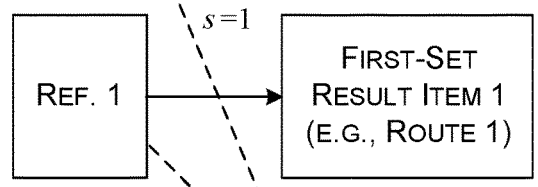

(NO MATCH, BUT SIMILAR)

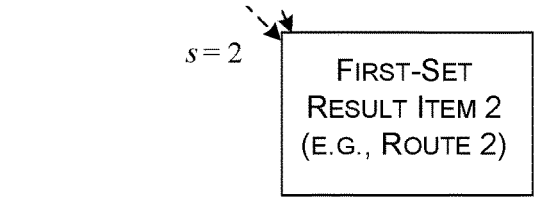

ACTUAL MATCHES

RELEVANCE = 3

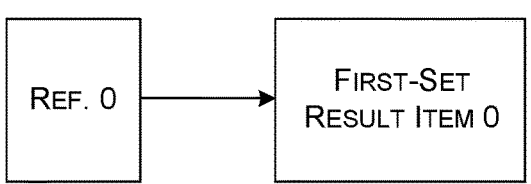

RELEVANCE = 2

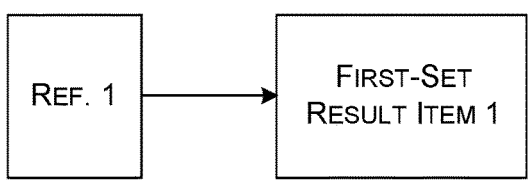

IDEAL MATCHES

FIG. 8

FOURTH EXAMPLE: $n_{Exp} = 3$, $n_{Ref} = 2$

| $i$ | FIRST-SET RESULT ITEM (E.G., ROUTE) | ACTUAL REFERENCE MATCH $j$ | ACTUAL RELEVANCE $rel_i$ | ACTUAL DISCOUNTED RELEVANCE $rel_i$ |
|---|---|---|---|---|
| 0 | 0 | 0 | 2 | 2.00 |
| 1 | 1 | 1 | 1 | 0.63 |
| 2 | 2 | (None, No Similarity) | 0 | 0.00 |

| $i$ | FIRST-SET RESULT ITEM (E.G., ROUTE) | IDEAL REFERENCE MATCH $j$ | IDEAL RELEVANCE $Rel_i$ | IDEAL DISCOUNTED RELEVANCE $Rel_i$ |
|---|---|---|---|---|
| 0 | 0 | 0 | 2 | 2.00 |
| 1 | 1 | 1 | 1 | 0.63 |
| 2 | 2 | 1 | 1 | 0.50 |

RELEVANCE = 3                                       RELEVANCE = 3

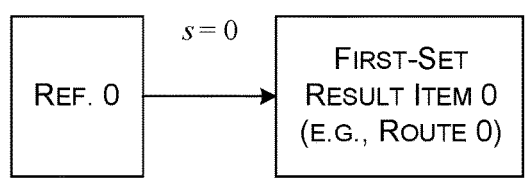    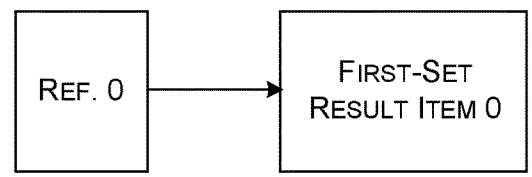

RELEVANCE = 2                                       RELEVANCE = 2

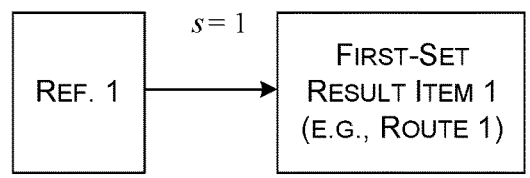    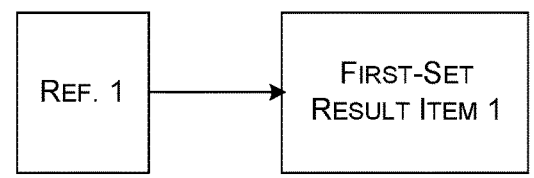

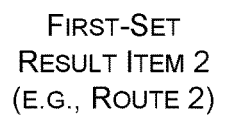    RELEVANCE = 1

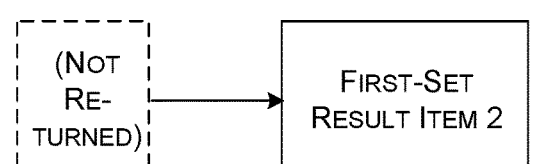

ACTUAL MATCHES          IDEAL MATCHES

FIG. 9

OVERVIEW OF OPERATION OF THE TESTING FRAMEWORK, 1002

OBTAIN A FIRST ORDERED SET OF FIRST-SET RESULT ITEMS PRODUCED BY A FIRST DATA-PROCESSING ENGINE IN RESPONSE TO AN INPUT QUERY.
1004

OBTAIN A SECOND ORDERED SET OF SECOND-SET RESULT ITEMS PRODUCED BY A SECOND DATA-PROCESSING ENGINE IN RESPONSE TO THE SAME INPUT QUERY, THE SECOND DATA-PROCESSING ENGINE SERVING AS A REFERENCE ENGINE THAT PROVIDES GROUND-TRUTH RESULT ITEMS.
1006

GENERATE ACCURACY INFORMATION BY ASSESSING ACCURACY OF THE FIRST-SET RESULT ITEMS RELATIVE TO THE SECOND-SET RESULT ITEMS, THE GENERATING BEING BASED ON AN ASSESSMENT OF ITEM SIMILARITY BETWEEN INDIVIDUAL PAIRINGS FORMED FROM THE FIRST ORDERED SET AND THE SECOND ORDERED SET, AND BASED ON A COMPARISON OF AN ORDER OF THE FIRST-SET RESULT ITEMS AND AN ORDER OF THE SECOND-SET RESULT ITEMS.
(SEE FIG. 11)
1008

PRODUCE OUTPUT INFORMATION THAT IDENTIFIES DEFICIENCIES IN THE FIRST DATA-PROCESSING ENGINE BASED ON THE ACCURACY INFORMATION, WHICH ENABLES MODIFICATION OF THE CONFIGURATION OF THE FIRST DATA-PROCESSING ENGINE TO INCREASE QUALITY OF RESULT ITEMS PRODUCED BY THE FIRST DATA-PROCESSING ENGINE.
1010

FIG. 10

OVERVIEW OF OPERATION OF THE
PROCESS OF GENERATING ACCURACY INFORMATION, 1102

PRODUCE MATCHING INFORMATION BY USING A PRESCRIBED TEST OF SIMILARITY TO IDENTIFY FIRST-SET RESULT ITEMS THAT MATCH RESPECTIVE SECOND-SET RESULT ITEMS.
1104

DETERMINE RELEVANCE INFORMATION BASED ON THE MATCHING INFORMATION, THE RELEVANCE INFORMATION INCLUDING INDIVIDUAL RELEVANCE MEASURES THAT EXPRESS RELEVANCE OF RESPECTIVE FIRST-SET RESULT ITEMS IN THE FIRST ORDERED SET.
1106

PRODUCE DISCOUNTED CUMULATIVE GAIN INFORMATION BASED ON AN AGGREGATION OF THE RELEVANCE MEASURES PRODUCED BY THE DETERMINING.
1108

PRODUCE THE ACCURACY INFORMATION BASED ON THE DISCOUNTED CUMULATIVE GAIN INFORMATION.
1110

FIG. 11

OVERVIEW OF OPERATION OF THE TESTING FRAMEWORK, 1202
(MAP NAVIGATION IMPLEMENTATION)

OBTAIN A FIRST ORDERED SET OF FIRST-SET ROUTE ITEMS PRODUCED BY A FIRST MAP ENGINE IN RESPONSE TO SUBMISSION OF AN INPUT QUERY.
1204

OBTAIN A SECOND ORDERED SET OF SECOND-SET ROUTE ITEMS PRODUCED BY A SECOND MAPPING ENGINE IN RESPONSE TO THE SAME INPUT QUERY, THE SECOND MAPPING ENGINE SERVING AS A REFERENCE ENGINE THAT PROVIDES GROUND-TRUTH ROUTE ITEMS.
1206

PRODUCE MATCHING INFORMATION BY USING A PRESCRIBED TEST OF GEOMETRIC SIMILARITY TO IDENTIFY FIRST-SET ROUTE ITEMS THAT MATCH RESPECTIVE SECOND-SET ROUTE ITEMS.
1208

DETERMINE RELEVANCE INFORMATION BASED ON THE MATCHING INFORMATION, THE RELEVANCE INFORMATION INCLUDING INDIVIDUAL RELEVANCE MEASURES THAT EXPRESS RELEVANCE OF RESPECTIVE FIRST-SET ROUTE ITEMS IN THE FIRST ORDERED SET.
1210

PRODUCE DISCOUNTED CUMULATIVE GAIN INFORMATION BASED ON AN AGGREGATION OF THE RELEVANCE MEASURES PRODUCED BY THE DETERMINING.
1212

PRODUCE ACCURACY INFORMATION BASED ON THE DISCOUNTED CUMULATIVE GAIN INFORMATION, THE ACCURACY INFORMATION EXPRESSING AN EXTENT TO WHICH THE FIRST MAPPING ENGINE PRODUCES ROUTE SUGGESTIONS THAT ARE ACCURATE AND CORRECTLY ORDERED.
1214

IDENTIFY DEFICIENCIES IN THE FIRST MAP ENGINE BASED ON THE ACCURACY INFORMATION.
1216

FIG. 12

OVERVIEW OF OPERATION OF A MAPPING ENGINE, 1302

RECEIVE AN INPUT QUERY THAT SPECIFIES A STARTING LOCATION AND ENDING LOCATION IN THE PHYSICAL SPACE.
1304

IDENTIFY ONE OR MORE CANDIDATE ROUTES BASED ON THE INPUT QUERY, EACH OF THE CANDIDATE ROUTES SPECIFYING A CANDIDATE PATH BETWEEN THE STARTING LOCATION AND THE ENDING LOCATION.
1306

GENERATE OUTPUT RESULTS THAT ENABLE NAVIGATION ALONG A SELECTED CANDIDATE ROUTE, CHOSEN FROM AMONG THE ONE OR MORE CANDIDATE ROUTES.
1308

FIG. 13

COMPARING ORDERED SETS GENERATED BY DIFFERENT DATA-PROCESSING ENGINES

BACKGROUND

Data-processing engines produce result items based on input queries submitted by users. For example, given a specified starting location and an ending location, a map engine generates an ordered set of one or more candidate routes for traveling between these two locations, arranged from most relevant to least relevant. It is challenging to test the accuracy of these kinds of data-processing engines in an effective and resource-efficient manner. These difficulties, in turn, may negatively impact the quality of updates made to the data-processing engines.

SUMMARY

A technique is described for updating a first data-processing engine based on reference information produced by a second data-processing engine. The technique involves obtaining a first ordered set of first-set result items produced by the first data-processing engine in response to an input query, and obtaining a second ordered set of second-set result items produced by the second data-processing engine in response to the same input query. The second-set result items serve as ground-truth result items. The technique then produces accuracy information by assessing the accuracy of the first-set result items relative to the second-set result items. The accuracy information is a set-wide assessment that reflects how well the first-set result items match second-set result items, taking into account item-to-item similarity among pairs of result items and the ordering of the result items. The technique then modifies a configuration of the first data-processing engine based on the accuracy information, with the objective of increasing the quality of result items produced by the first data-processing engine.

In some implementations, the first and second data-processing engines are first and second map engines. Each map engine accepts an input query that specifies a starting location and an ending location. In response, each map engine produces an ordered set of candidate route items for traveling between the starting location and the ending location. Other implementations apply the above-summarized technique to compare ordered sets produced by other types of engines, including spell-checking engines, recommendation engines, etc.

The technique provides a holistic way of comparing two sets of route items, encapsulating item-to-item differences and ordering differences in a single metric. This enables the production of updates that improve the quality of the first data-processing engine. In the realm of map processing, improving the quality of a map engine has the effect of enabling a user to more efficiently navigate through a physical space. The technique also makes efficient use of computing resources for reasons described herein.

The above-summarized technology is described herein as manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 6-9 shows four respective examples of the operation of the testing framework of FIG. 1.

FIG. 10 shows a process that describes an overview of one manner of operation of the testing framework of FIG. 1.

FIG. 11 shows a process that provides further illustrative detail regarding the process of FIG. 10.

FIG. 12 shows a process that represents the application of the processes of FIGS. 10 and 11 to the field of map-based navigation.

FIG. 13 show a process that provides an overview of the operation of a map engine in a production stage.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative testing framework for training a data-processing engine (e.g., a map engine). Section A also describes the production-stage operation of the data-processing engine itself in a production stage. Section B sets forth illustrative methods that explain the operation of the testing framework and data-processing engine (in the production stage). Section C describes illustrative computing functionality that, in some implementations, is used to implement any aspect of the features described in Sections A and B.

A. Illustrative Computing Systems

Figure 1:
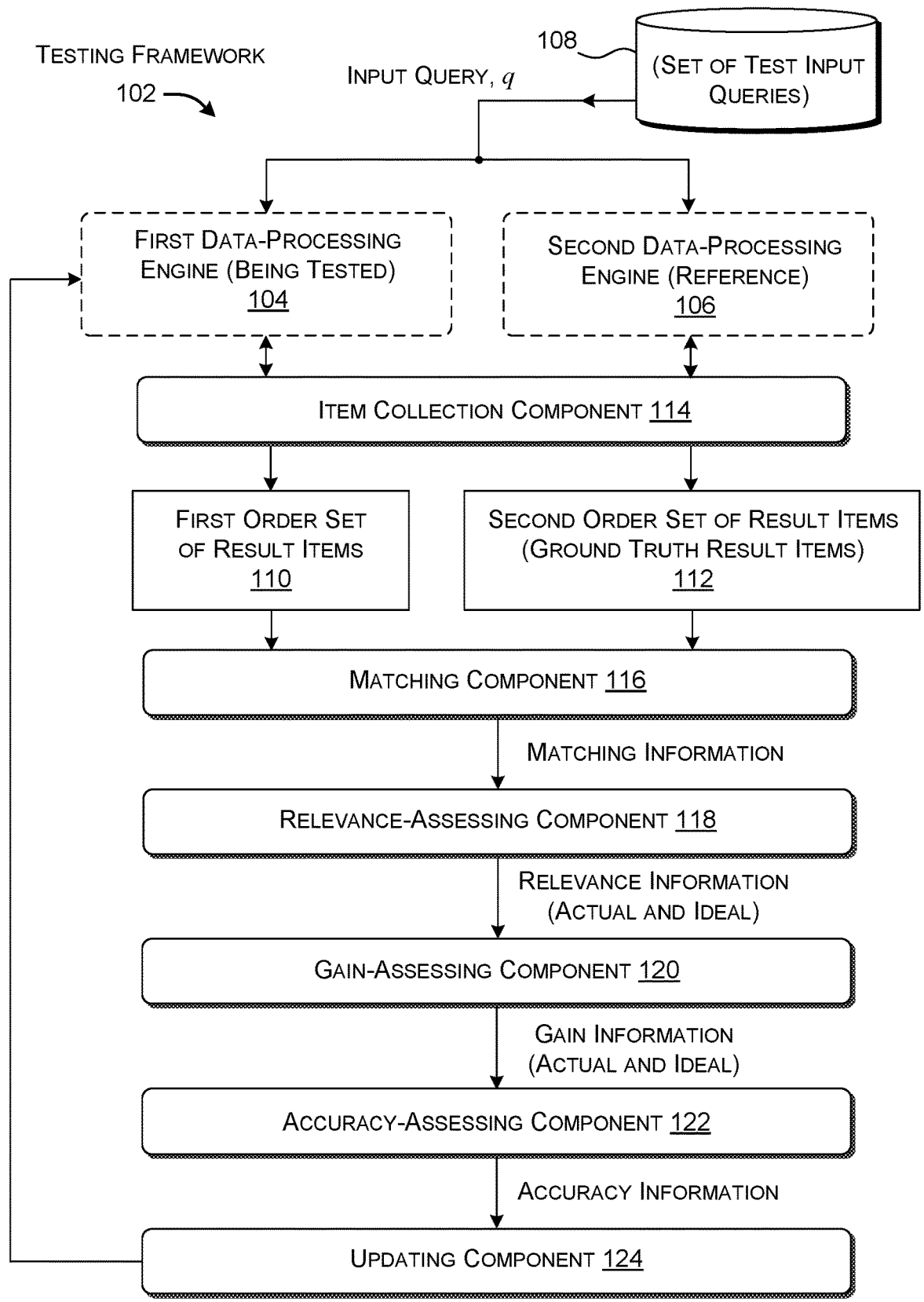
FIG. 1 shows a testing framework for updating a first data-processing engine based on reference information produced by a second data-processing engine.

FIG. 1 shows an overview of a testing framework 102 for testing the accuracy of result items produced by a first data-processing engine 104 based on ground-truth reference information produced by a second data-processing engine 106. In some implementations, the testing framework 102 uses the results of its testing to guide updates made to the first data-processing engine 104. For instance, upon discovering that the result items produced by the first data-processing engine 104 are markedly different than the ground-truth reference information, the testing framework 102 makes adjustments to the first data-processing engine 104 to improve the quality of its result items.

This description emphasizes the example in which the first data-processing engine 104 is a first map engine and the second data-processing engine 106 is a second map engine.

In this case, each map engine receives an input query that specifies at least a starting location and ending location. In response thereto, the map engine generates an ordered set of one or more candidate route items, arranged from most relevant to least relevant. Each route item specifies a candidate path through physical space from the starting location to the ending location. In this context, the goal of the testing framework 102 is to test the first map engine based on route items produced by the second map engine, which are accepted as ground-truth items.

More generally, however, the testing framework 102 may be applied to test the performance of any type of data-processing engine. For example, the testing framework 102 can test the performance of language-processing engines (e.g., spelling checkers), recommendation engines (e.g., product and service recommenders), and so on. Each such data-processing engine maps an input query to a ranked set of result items. For instance, a spelling checker maps an input word that is misspelled into a plurality of candidate corrections for this word. A hotel recommender maps a query that specifies a name of a city with proposed hotel choices, and so on. While the testing framework 102 has diverse applications, the following description will first explain it in a generic context.

As a shorthand reference, the first data-processing engine 104 is also referred to below as the "experimental" data-processing engine, since this engine is the functionality being tested. The second data-processing engine 106 is also referred to as the "reference" data-processing engine, since it is used to produce result items that serve as reference information.

The testing framework 102 executes a flow for a plurality of test input queries provided in a data store 108, such as representative test input query q (simply referred to below as an "input query" for brevity). The first data-processing engine 104 maps the input query into a first ordered set 110 of first-set result items, and the second data-processing engine 106 maps the same input query into a second ordered set 112 of second-set result items. The qualifier "first-set" indicates that a result item is a member of the first ordered set 110, and the qualifier "second-set" indicates that a result item is a member of the second ordered set 112. A "result item" itself corresponds to a unit of information returned by a data-processing engine, such as a route description, a hotel description, or a candidate spelling correction.

An ordered set of result items refers to a data structure that arranges a set of result items in the order of most relevant to least relevant. In many contexts, a data processing engine presents the most relevant result item at a top of a list of result items, or at some other prominent location, and presents the least relevant result item at the bottom of the list, or at some other less prominent location.

Although produced based on the same input query, the first ordered set 110 may differ from the second ordered set 112 in various ways. For example, the first ordered set 110 may contain one or more result items that match corresponding result items in the second ordered set 112, where matching between any two items is gauged based on a prescribed test of similarity described below. But the first data-processing engine 104 may place at least some of its result items at positions in the first ordered set 110 that differ from the positions of the corresponding result items in the second ordered set 112. In addition, or alternatively, the first ordered set 110 may contain result items that are not found in the second ordered set 112, and vice versa.

A data-collecting component 114 obtains the first ordered set 110 and the second ordered set 112 from the first data-processing engine 104 and the second data-processing engine 106, respectively. In some implementations, the data-collecting component 114 performs this task by making requests to the data-processing engines (104, 106) via application programming interfaces (APIs) provided by the data-processing engines (104, 106). In some implementations, the data-collecting component 114 specifically requests a first API to provide a prescribed number of first-set result items from the first data-processing engine 104, and requests a second API to provide the same prescribed number of second-set result items from the second data-processing engine 106. In some cases, the data-processing engines (104, 106) satisfy this request by providing the same number of requested data items. More generally assume, however, that the number ($n_{Exp,q}$) of result items in the first ordered set 110 need not equal the number ($n_{Ref,q}$) of result items in the second ordered set 112. The subscripts "Exp" and "Ref" are shorthand reference to "Experimental" and "Reference," respectively, indicating that symbols bearing these subscripts pertain to the Experimental (first) data-processing engine 104 and the Reference (second) data-processing engine 106, respectively. The subscript q indicates that the result items in the two sets are generated for the input query q. The first data-processing engine 104 may provide fewer result items than the second data-processing engine 106 because the first data-processing engine 104 may not identify a requested number of result items having at least a prescribed level of relevance. Alternatively, the opposite may be true (meaning that the second data-processing engine 106 may fail to identify the requested number of result items).

A matching component 116 matches the second-set result items with respective first-set items based on item-to-item similarity analysis between the first-set items and the second-set items. For example, the matching component 116 matches a particular second-set result item with a particular first-set result item based on a conclusion that the similarity between these two result items satisfies a prescribed similarity test. In the realm of map-based navigation, the similarity test may involve determining the Fréchet distance between two route items under consideration, and using that distance, together with the path lengths of the two routes, to make a determination of whether the two route items are sufficient similar. The matching component 116 outputs matching information that describes its identified pairings of result items.

A relevance-assessing component 118 assigns a relevance measure to each first-set result item, based on the matching information generated by the matching component 116. For example, assume that the first data-processing engine 104 originally assigns a particular first-set result item as the first entry in first ordered set 110, reflecting its conclusion that this result item is the most relevant in the first ordered set 110. But assume that the matching component 116 reveals that this first-set result item is similar to the second-set result item occurring in the third position of the second ordered set 112. In response, the matching component 116 assigns a relevance measure to this particular first-item result item that has the effect of downgrading its relevance, relative to its original assessed status as the most relevant. The relevance-assessing component 118 outputs relevance information that expresses the matches that it has identified.

In some implementations, the relevance-assessing component 118 generates actual relevance information and ideal relevance information. Actual relevance information refers, in aggregate, to actual relevance measures computed for the first-set result items. Ideal relevance information refers, in aggregate, to ideal relevance measures computed for the first set result items. The explanation below will explain how illustrative implementations compute the actual and ideal relevance measures for different cases. For one such case, the actual relevance measure for a first-set result item is based on the position of a matching second-set result item (if any) in the second ordered set 112. For one case, the ideal relevance measure for a first-set result item is based on the position of the first-set result item in the first ordered set 110, meaning that, for instance, the first-occurring first-set result item in the first ordered set 110 should ideally have maximum relevance.

It may therefore be generally said that the actual relevance information reflects, in aggregate, the relevance of the first-set result items in the first ordered set 110 when measured against both the second-set result items that appear in the second ordered set 112 and the arrangement of the second-set result items in the second ordered set 112. The ideal relevance information expresses, in aggregate, the relevance of the first-set result items for the ideal case in which the entries in the first ordered set 110 match the entries in the second ordered set 112 (except when a given first-set result item is deemed relevant yet redundant), and appear in the same order as the entries in the second ordered set 112. As another characteristic, the ideal relevance information expresses relevance of the first-set result items based on an expectation that more relevant first-set result items should be ranked more favorably than less relevant first-set result items. Again, these definitions presume that the second ordered set 112 contains, by definition, the most appropriate result items in the most appropriate order.

A gain-assessing component 120 computes discounted gain information based on relevance information produced by the relevance-assessing component 118. The gain-assessing component 120 performs this task by producing a weighted sum of the individual relevance measures generated by the relevance-assessing component 118. The weighting discounts the contribution of each relevance measure as a function of the position of that relevance measure in an ordered set of relevance measures, e.g., such that the gain-assessing component 120 will apply the smallest discount to the top (most relevant) relevance measure in the ordered set, and the largest discount to the bottom (least relevant) relevance score in the ordered set. In some implementations, the smallest discount applied to the top relevance measure is no discount (e.g., associated with a weight value of 1.0). In some implementations, the gain-assessing component 120 specifically generates actual discounted cumulative gain information by forming a weighted sum of the actual relevance measures, and ideal discounted cumulative gain information by forming a weighted sum of the ideal relevance measures.

An accuracy-assessing component 122 assesses the accuracy of the first-set result items relative to the ground-truth information expressed by the second-set result items based on the discounted gain information. In some implementations, the accuracy-assessing component 122 performs this task by normalizing the actual discounted cumulative gain information by the ideal discounted cumulative gain information, e.g., by forming the ratio of these two instances of discounted gain information. This yields a normalized discounted cumulative gain measure for the particular input query under consideration. The normalized discounted cumulative gain measure is a joint measure that reflects an assessment of item-to-item differences and item-ordering differences.

The testing framework 102 can perform the same analysis described above with respect to plural input queries, in parallel and/or in series. As a result, the accuracy-assessing component 122 will produce a plurality of normalized discounted cumulative gain measures. The accuracy-assessing component 122 can perform a more encompassing assessment of the accuracy of the first data-processing engine 104 by generating the average of these individual normalized discounted cumulative gain measures.

An updating component 124 updates the operation of the first-data processing engine 104 based on the accuracy information. Different implementations of the updating component 124 perform this task in different respective ways. For instance, as a first task, the updating component 124 may use rules-based analysis and/or a machine-trained model to identify the causes of any errors revealed by the accuracy information. For example, the updating component 124 may apply logic that operates by: 1) identifying a group of queries that cause the two data-processing engines (104, 106) to produce divergent result items; 2) identifying common factors among the identified group of queries; and 3) identifying the empirical source(s) of the divergent result items based on the identified common factors.

In performing this analysis, the updating component 124 operates on the final accuracy information generated by the testing framework 102 together with the preliminary query-specific results generated by the testing framework 102, on which the final accuracy information is based. For instance, in some implementations, the updating component 124 performs cluster analysis on query-specific relevance information (produced by the relevance-assessing component 118). This analysis helps identify the queries that produced poor accuracy, and the commonalities among these queries.

The updating component 124 may implement the above-described logic as a discrete algorithm implemented by a computer program and/or by a machine-trained model. For instance, some implementations of the updating component 124 form a feature vector that expresses the final accuracy information and the preliminary query-specific information described above. A machine-trained model maps the feature vector into an output conclusion. That output conclusion may identify a roadway or other geographic feature that is the source of the discrepancy between the first-set result items and the second-set result. Some implementations implement the machine-trained model as a neural network. For instance, some implementations implement the machine-trained model as a transformer-based neural network or convolutional neural network followed by one or more classification layers (e.g., including a Softmax layer). Further, the testing framework 102 can compute loss information based on the difference between the first-set route items and the second-second set route items, and use this loss information to update the machine-trained model, e.g., using gradient descent in combination with back propagation.

The updating component 124 then takes corrective action to rectify any discovered errors revealed by its analysis. In some implementations, the updating component 124 produces a report that summarizes its analysis, e.g., via a user interface presentation. A human administrator then manually makes whatever corrections are suggested by the report. Alternatively, or in addition, the updating component 124 automatically takes corrective action.

For example, consider the case in which a first (experimental) map engine relies on a first map database that omits a particular road of which a second (reference) map engine is aware. Alternatively, or in addition, the first map engine may rely on a first map database that indicates that a particular road is available, whereas the second map engine correctly reflects that the road is no longer usable for any reason (e.g., due to a construction project affecting the road or a public event, such as a road race or parade). These map differences may cause the first map engine to produce erroneous or otherwise substandard route items, relative to the route items generated by the second map engine. Further, these discrepancies will only manifest themselves when users submit input queries that implicate the geographic region for which there is a discrepancy between map databases.

The updating component 124 leverages the above observations by: (1) pinpointing the geographic region in question; (2) comparing the two engine's representation of this geographic region in their respective map databases, to identify differences; and (3) correcting any errors thus discovered. For example, assume that the above analysis reveals that a particular route is labeled as available in the first map database and unavailable in the second map database. The updating component 124 may address this problem by changing the status of the route to unavailable in the first map database. That is, a human administrator may make this change, or the updating component 124 may automatically make this change.

Taking a more encompassing perspective, the testing framework 102 can be applied in different testing environments. In one such environment, the first and second data-processing engines (104, 106) represent two competing entities (or two variants of the same entity) that perform the same function. For instance, assume that the first and second-data processing engines (104, 106) represent different map engines provided by two different commercial entities. Here, the testing framework 102 is administrated by the entity that implements the first data-processing engine 104. The testing framework 102 treats the result items generated by the second data-processing engine 106 as canonical ground-truth information against which the result items generated by the first data-processing engine 104 are compared. The second data-processing engine 106 may produce more reliable result items than the first-data processing engine 104 for any number of reasons, such as: 1) the second data-processing engine 106 uses a more robust empirical database compared to the first data-processing engine 104 (where robustness is reflected in database coverage, database correctness, etc.); 2) the second data-processing engine 106 allocates more processing resources and/or human resources to its service compared to the first data processing engine 104; 3) the second data-processing engine 106 uses more accurate models and algorithms compared to the first data-processing engine 104; 4) the second data-processing engine 106 embodies a level of refinement that is higher than that of the first data-processing engine 104 (which may be attributed, in part, to the fact that the second data-processing engines 106 has been operating longer than the first data-processing engine 104), and so on.

In other testing environments, assume the case in which the second data-processing engine 106 is used exclusively in the testing framework 102, and is not intended to operate in a production stage to provide a service to end users. For instance, assume that the second data-processing engine 106 achieves high-accuracy result items through the use of a significant amount of processing resources and algorithm/model complexity. But assume that this infrastructure renders the second data-processing engine 106 unsuitable for production-stage use. For example, the second data-processing engine 106 may deliver its result items with too much latency to make it suitable for processing real-time user queries. Alternatively, or in addition, a production-stage platform may lack sufficient resources to run the second data-processing engine 106. This may be particularly true for resource-constrained user devices, such as smartphones. Assume, by contrast, that the first data-processing engine 104 uses less computing resources compared to the first data-processing engine 104, but at the expense of sometimes providing less accurate result items compared to the second data-processing engine 106.

In this setting, the testing framework 102 uses the "large" accurate second data-processing engine 106 as a teacher to train the "smaller" less capable first data-processing engine 104, which functions as a student. The testing framework 102 performs this task by using the result items generated by the second data-processing engine 106 as a ground-truth training set to train the operation of the first data-processing engine 104. In this manner, the first data-processing engine 104 can indirectly leverage the complexity of the second data-processing engine 106 without devoting the same amount of resources as the second data-processing engine 106, and without incurring the same latency costs as the second data-processing engine 106. In this implementation, the same entity may produce and administer the first and second data-processing engines (104, 106).

Figure 2:
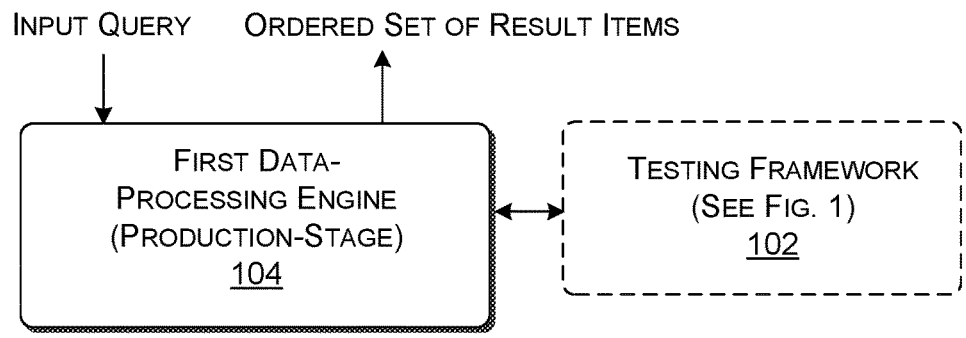
FIG. 2 depicts the first data-processing engine (of FIG. 1) in a production-stage environment.

FIG. 2 shows the first data-processing engine 104 of FIG. 1 operating in a production-stage context (meaning that it is deployed on a production system and provides a service to end users). The first data-processing engine 104 receives an input query from an end user. In response, the first data-processing engine 104 generates an ordered set of result items, and provides the ordered set of result items to the end user. FIG. 2 also shows that the first data-processing engine 104 is refined based on guidance from the testing framework 102.

More specifically, the testing framework 102 works in parallel with the production-stage use of the first data-processing engine 104. In some implementations, the testing framework 102 specifically operates on the same input queries submitted by end users. Alternatively, or in addition, the testing framework 102 operates on synthetic input queries (e.g., randomly-generated input queries) that were not submitted by the end users. The testing framework 102 can specifically perform its updating on any basis, such as a periodic basis or a demand-driven basis. For instance, the testing framework 102 can update the first data-processing engine 104 when the result items that it produces are discovered to significantly diverge from ground-truth result items produced by the second data-processing engine 106 (which is not specifically shown in FIG. 2).

In some cases, the input query corresponds to one or more words and/or numbers (and/or other character information) that a user supplies via browser application of a computing device, or through some other dedicated application interface. Alternatively, or in addition, the input query includes information selected by the user, e.g., by clicking on the information in a user interface presentation. Alternatively, or in addition, the input query includes text extracted from a website or document that the user is currently viewing, and so on. Alternatively, or in addition, the input query provides metadata that describes the user's current context. For example, the input query may include position information that reflects the user's current position.

Figure 3:
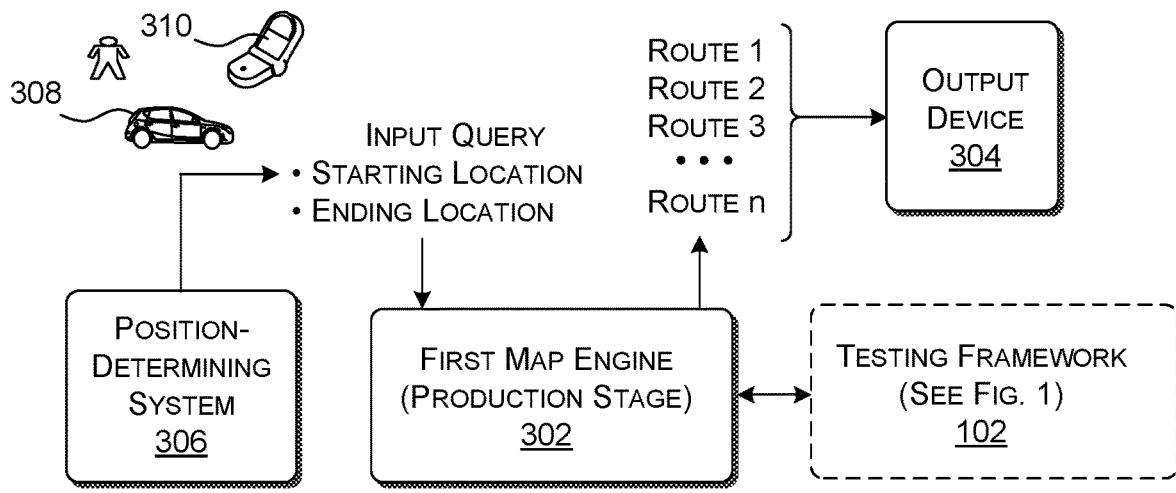
FIG. 3 shows an application of the functionality shown in FIG. 2 to the processing of map-related input queries.

FIG. 3 shows a production-stage example in which the first data-processing engine 104 is specifically a map engine 302 (and the second data-processing engine 106, not shown, is another map engine). In one use, assume that a user plans to travel from a starting location to an ending location on foot or using any kind(s) of vehicle(s), or some combination thereof. The user interacts with the map engine 302 to find a suitable route for making this journey. In operation, the map engine 302 receives an input query that specifies the starting location and the ending location. In response, the map engine 302 generates an ordered set of route items, each of which specifies a candidate path between the starting location and the ending location. An output device 304 presents the route items to the user. The output device 304 represents a display device, speaker, archival storage device, etc., or any combination thereof. Alternatively, or in addition, an autonomous driving system (not shown) directs a vehicle to the ending location based on a top-ranked route item.

Different environments allow a user to generate the input query in different ways. In some cases, for instance, a user may manually input the starting location and ending location through any type of text-based or audio-based user interface presentation. Alternatively, or in addition, a position-determining system 306 automatically detects at least the user's current position, which the map engine 302 interprets as the starting location to be used in the input query. The position-determining system 306 relies on any technique(s) to perform this task, including any of global positioning system (GPS) processing, triangulation processing based on terrestrial wireless signal sources, signal processing in response to the detection of signals emitted by local beacon emitters, and so on. In some implementations, the position-determining mechanism is a component of a user's mobile device 308, vehicle navigation system provided in a vehicle 310 of any type, and so on. In addition, or alternatively, the position-determining system 306 determines a pre-generated location associated with a browser identifier, Internet service provider, etc., and uses this location as the user's current location.

In the examples set forth above, the second data-processing engine 106 serves a role in improving the quality of the first-data processing engine 104, but it does not otherwise play a role in generating a response to a user's input query. In other examples, a single production-stage application system (not shown) uses the logic of the testing framework 102 in the production stage to process a user's input query. The application system can leverage the two data-processing engines (104, 106) for various purposes. In one case, the application system uses reference information produced by the second data-processing engines 106 to verify the accuracy of the result items produced by the first data-processing engine 104. The application system reveals the accuracy information to the user in different ways, such as by providing a notification that alerts the user to the fact that the first-set result items depart from the second-set result items by more than a threshold amount. In addition, the application system can present the second-set result items, in addition to the first-set result items. In addition, or alternatively, the application system can apply the accuracy information to selectively remove result items that have been determined to contribute to low accuracy.

Figure 4:
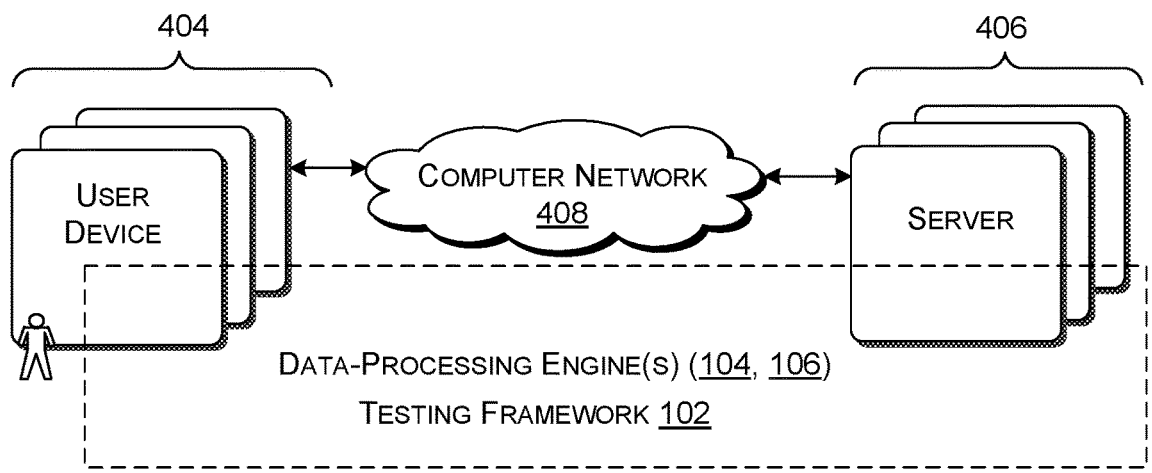
FIG. 4 shows illustrative computing equipment that is capable of implementing the functionality of FIGS. 1-3.

FIG. 4 shows an example of computing equipment 402 that, in some implementations, is used to implement aspects of the testing framework 102 and/or any of the data-processing engines (104, 106). The computing equipment 402 includes a set of user devices 404 coupled to a set of servers 406 via a computer network 408. Each user device corresponds to any type of computing device, including any of a desktop computing device, a laptop computing device, a handheld computing device of any type (e.g., a smartphone or a tablet-type computing device), a mixed reality device, a wearable computing device, an Internet-of-Things (IOT) device, a gaming system, a media device, a vehicle-borne computing system, any type of robot computing system, a computing system in a manufacturing system, etc. In some implementations, the computer network 408 is implemented as a local area network, a wide area network (e.g., the Internet), one or more point-to-point links, or any combination thereof.

The dashed-line box in FIG. 4 indicates that the functionality of the testing framework 102 and the data-processing engines (104, 106) is capable of being spread across the user devices 404 and/or the servers 406 in any manner. For instance, in some cases, each user device with which a user interacts implements a local version of the first data-processing engine 104, e.g., as part of a locally-installed application. Here, the servers 406 do not play any role in the operation of the first data-processing engine 104, other than downloading the application that implements the first data-processing engine 104. In other implementations, one or more of the servers 406 implement the entirety of the first data-processing engine 104. A user interacts with the first data-processing engine 104 via a browser application or other suitable interface application. In other cases, the functionality associated with the first data-processing engine 104 is distributed between the servers 406 and each user device in any manner. For example, each user device implements a user interface experience provided by the first data-processing engine 104, while the servers 406 implement data-intensive computations performed by the first data-processing engine 104. Likewise, the components of the testing framework 102 as a whole can be distributed between the user devices 404 and the servers 406 in various ways.

The testing framework 102 has various technical merits. Consider, for example, the case in which the first and second data-processing engines (104, 106) are map engines. Further, consider the illustrative case in which a test environment generates and stores, as a preliminary operation, Fréchet distance measures (described below) that express the respective distances between pairs of route items. It is a time-consuming and resource-intensive process to generate these distance measures. The testing framework 102 performs its analysis based on the distance measurements, without requiring their re-computation. Further, the testing framework 102 performs its analysis in a relatively short amount of time (e.g., less than a minute in some cases), without requiring the use of a large amount of additional computing resources (that is, beyond the resources used to compute the distance measures).

In other implementations, the testing framework 102 generates the Fréchet distances on an as-needed basis, e.g., when a comparison between result items is performed that requires these measures. The testing framework 102 then stores the computed Fréchet distances, so they do not need to be recomputed if needed again. This process is more efficient than a preliminary distance-calculating operation that calculates the similarity between each possible pair of result items. That is, the matching component 116 of the testing framework 102 performs matching in such a manner (described below) that some item-to-item comparisons are not required. The testing framework 102 reduces the latency of its analysis and its consumption of resources by not performing item-to-item comparisons that are not used.

The testing framework 102 ultimately allows a developer to improve the quality of a data-processing engine. An improved data-processing engine, in turn, allows the user to perform tasks in a more effective and efficient manner. Again consider the case of a map engine. The testing framework 102 improves the quality of candidate route items delivered to users. This allows the users to more efficiently navigate to target destinations. Without this improvement, the map engine may advise a user to take a route that no longer exists, or is no longer the most efficient route, due to any number of environment-specific reasons. This advice will delay the user in reaching his or her target destination. The testing framework 102 reaches its conclusion based on real-world empirical data, such as the distances of candidate routes and the current states of roadways.

The remainder of Section A sets forth further details regarding illustrative implementations of the components of the testing framework 102 of FIG. 1. To facilitate description, the components will be explained in the illustrative context in which the first and second data processing engines (104, 106) correspond to first and second map engines that produce first and second ordered sets (110, 112) of route items. Each route item describes a candidate path between a starting location and an ending location specified in the input query. The same principles described below, however, can be applied to any data-processing environment, including product recommendation, spelling correction, etc.

Figure 5:
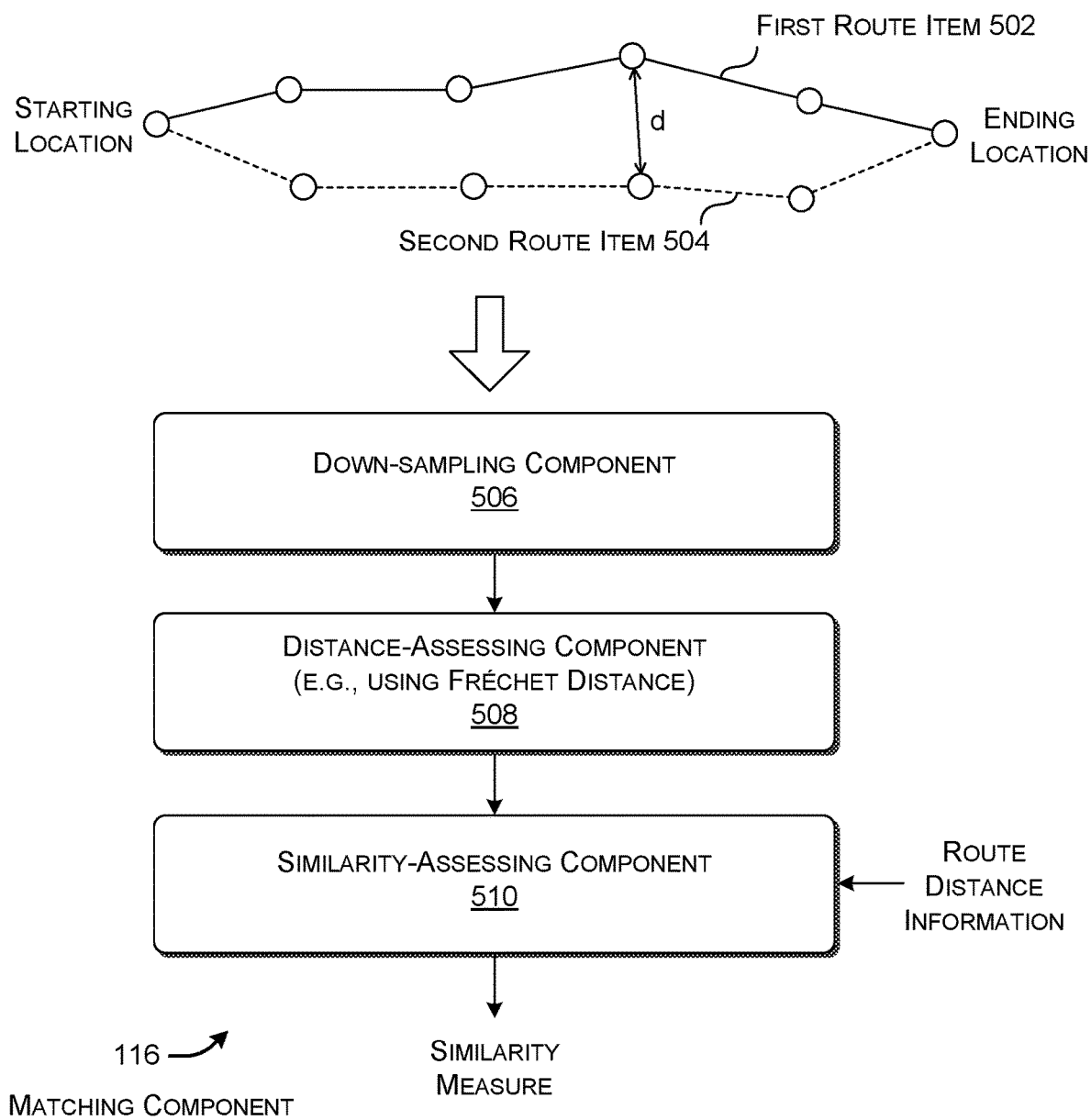
FIG. 5 shows one implementation of a matching component, which is one element of the testing framework of FIG. 1.

Beginning with FIG. 5, this figure shows one implementation of the matching component 116. In the example shown in FIG. 5, assume that the first (experimental) map engine produces a first route item 502, and the second (reference) map engine produces the second route item 504. Each map engine can generate its result items using any algorithm, such as, in part, the traveling salesman algorithm. Each map engine relies on empirical data in making its determinations, including data that describes the lengths of roadways, the availability of the roadways, the current traffic conditions of the roadways, and so on. The map engine may preliminarily order the route items in the set based on a combination of empirical factors, such as route length and/or travel time. The matching component 116 determines whether the first route item 502 is sufficiently similar to the second route item 504, with respect to a prescribed test of similarity.

In other implementations, a data processing engine produces results items based on other considerations, including assessments of the extent to which the results items match an input query, reviews of the products associated with the result items, the prices of the products, the popularity of the result items (e.g., as reflected by click data), the extent to which the result items are linked to other result items, and on.

Each route item expresses a candidate path between a starting location and an ending location. In some implementations, each route item is a polyline, e.g., meaning that it is composed of a sequence of line segments connected by nodes. Note that FIG. 5 is a much-simplified example of the two route items (502, 504), presented here for the purpose of explanation; an actual route item may include hundreds of line segments. The map engines may express each route as a series of coordinate pairs.

An optional down-sampling component 506 reduces the complexity of the first and second route items (502, 504), e.g., by reducing the number of line segments in the route items (502, 504). This operation enables the matching component 116 to process the route items (502, 504) with reduced latency and reduced consumption of computing resources. The down-sampling component 506 may rely on any down-sampling algorithm to perform its task. In one case, for example, the down-sampling component 506 combines two successive line segments if either of the line segments has a distance below a prescribed threshold value. In another example, the down-sampling component 506 uses the Ramer-Douglas-Peucker algorithm. General background information on this algorithm is available at DOUGLAS, et al., "Algorithms for the Reduction of the Number of Points Required to Represent a Digitized Line or its Caricature," in The Canadian Cartographer, Vol. 10, No. 2, 1973, pp. 112-122.

The distance-assessing component 508 produces a distance metric that conveys the extent to which the first route item 502 and second route item 504 follow similar spatial trajectories. The distance-assessing component 508 may rely on any technique to reach this conclusion, such as Fréchet distance analysis, dynamic time warping, edit distance analysis with real penalty (EDR), and so on. General background information on the topic of trajectory analysis techniques is provided, for instance, in TOOHEY, et al., "Trajectory Similarity Measures," in SIGSPATIAL Vol. 7, No. 1, March 2015, pp. 43-50. General background information on the specific topic of Fréchet analysis can be found at ALT, et al., "Computing the Fréchet Distance Between Two Polygonal Curves," in International Journal of Computational Geometry and Applications, Vol. 5, Nos. 1-2, 1995, pp. 75-91.

Other types of metrics may be appropriate for other types of data-processing engines. For example, in some implementations, the distance-assessing component 508 determines the distance between two linguistic items using any lexical metric, such as an edit distance metric. In other implementations, the distance-assessing component 508 determines the similarity between two hotel recommendations by using a neural network to map the two recommendations into distributed-representation vectors, and then using cosine similarity to determine the distance between the vectors in vector space.

In other examples, the distance-assessing component 508 can determine the similarity between a pair of result items in an environment-specific manner using comparisons that are relevant to that environment, but may not be relevant to other environments. For example, consider the case in which the distance-assessing component 508 determines the distance between two hotel recommendations. The distance-assessing component 508 may take into consideration the extent to which: the names of the hotel match or otherwise pertain to the same commercial entity; the addresses of the hotels match, and so on.

In the particular case of the Fréchet distance, this metric may be conceptualized by imagining two travelers traversing the two routes (502, 504), with a rope connecting the two travelers. The Fréchet distance is the minimum length of that rope that is required as the users move along their respective paths from the starting location to the ending location. This calculation assumes that the travelers may vary their respective speeds, but cannot move backwards along their paths (meaning that that their travel is monotonically non-decreasing). In some implementations, the distance-assessing component 508 computes the Fréchet distance using any dynamic programming technique, with optional reliance on a free space diagram. Insofar as the Fréchet distance reflects the similarity between trajectories having different spatial paths, it may be considered a measure of geometric similarity, or, more generally, item-to-item similarity.

As noted above, in some implementations, the distance-assessing component 508 performs its analysis on all pairs of route items as a preliminary task, where each pair includes a particular first-set route item and a particular second-set route item. The distance-assessing component 508 then stores the thus-produced distance measures in a data store. A similarity-assessing component 510 performs its processing based, in part, on the distance measures stored in the data store. Alternatively, or in addition, the testing framework 102 can invoke the distance-assessing component 508 on an as-needed basis, e.g., when a comparison between two particular route items is needed.

In some implementations, the similarity-assessing component 510 computes the similarity between the two route items (502, 504) using the distance metric computed by the distance-assessing component 508 and the respective lengths (distances) of each individual route item. More specifically, assume that the length of the first route item is $TDI_{Exp}$, and the length of the second route item is $TDI_{Ref}$. The length of a route item reflects the sum of the individual lengths of the individual path segments which compose it. The similarity-assessing component 510 determines that the two route items (502, 504) are similar if either of two conditions are satisfied: (1) the distance metric (e.g., the Fréchet distance) computed by the distance-assessing component 508 is below a prescribed threshold value (e.g., 451 meters); or (2) the Fréchet distance divided by the sum of $TDI_{Exp}$ and $TDI_{Ref}$ is below another prescribed threshold (e.g., 0.038 meters). These computations produce an assessment that is normalized with respective to route length, taking into account the fact that the significance of the Fréchet distance increases as the route lengths of the routes decrease. If neither of conditions (1) nor (2) are satisfied, the similarity-assessing component 510 identifies the two route items as not being similar.

In the above-described example, the similarity-assessing component 510 operates as a binary classifier, classifying a candidate pairing as either similar (Similarity=1) or not similar (Similarity=0). In other implementations, the similarity-assessing component 510 identifies geometric similarity within a range of similarity values including more than two values. Further, the specific threshold values mentioned above are empirically-derived values that may be appropriate for one environment, but other threshold values may be appropriate for other environments.

Now advancing to the relevance-assessing component 118, this component computes relevance information that includes two parts: actual relevance information ($Relevance_{Actual}$) and ideal relevance information ($Relevance_{Ideal}$). The actual relevance information is based on the actual matches made by the matching component 116 as given, compared with the reference information defined by the second ordered set 112. The ideal relevance information reflects the idealized case in which first route items are arranged from most relevant to least relevant with respect to the reference information defined by the second ordered set 112. Each individual actual relevance measure in the actual relevance information is denoted by $rel_i$ (where i refers to the index value of the actual result measure). Each individual ideal relevance measure is denoted by $Rel_i$. These measurements are made with respect to a particular input query q, but the subscript q has been omitted above to simplify the explanation.

More specifically, the relevance-assessing component 118 computes an actual relevance measure for each index value s. For the case in which both the first ordered set 110 and the second ordered set 112 have the same number of result items ($n_{Exp,q} = n_{Rel,q} = n$), then the relevance-assessing component 118 calculates an actual relevance measure for each of those n index values. The subscript q in these symbols indicates that the symbols pertain to route items generated for a particular input query q. For the case in which one of the ordered sets has more result items than the other, the relevance-assessing component 118 will also generate an actual relevance measure for each "extra" result item that is included in the larger ordered set and which is not present in the smaller ordered set. More formally stated, the relevance-assessing component 110 generates an actual relevance value for each index value s ranging from 0 to [$\max(n_{Exp,q}, n_{Ref,q})-1$]. In some implementations, relevance is considered to increase with increasing numerical relevance measure (such that 0 conveys lowest relevance), but other implementations can define relevance in a different manner.

In some implementations, the relevance-assessing component 118 applies the following rules to generate actual relevance measures for each index item s.

a) Rule 1. A particular first-set route item at position s matches a particular second-set route item at index value j, where j is within the bounds of the second ordered set 112 (that is, $0 \leq j < n_{Ref,q}$). In this situation, the relevance-assessing component 118 calculates the actual relevance measure as $rel = n_{Ref,q} - j$. More generally stated, the relevance-assessing component 118 chooses the value of the actual relevance measure in this situation as a function of the position of the matching second-set route item in the second ordered set 112.

b) Rule 2. The first-set route item at index value s does not match any second-set route item, and the current position s is no larger than the size of the ordered set having the least number of entries (e.g., $s < \min(n_{Exp,q}, n_{Ref,q})$). In this situation, the relevance-assessing component 118 sets the actual relevance measure to zero (rel=0).

c) Rule 3. The value of s under consideration is larger than the number of result items in the first ordered set 110 (that is, $s \geq n_{Exp,q}$). In this situation, the relevance-assessing component 118 sets the actual relevance measure to zero (rel=0).

d) Rule 4. The value of s under consideration is larger than the number of result items in the second ordered set 112 (that is, $s \geq n_{Ref,q}$). Further assume that there is no match between the first-set route item at index value s and any second-set route item. Further still, assume that there is no similarity between the first-set result item at index value s and any other second-set route item, including second-set route items that have already received matches (and are therefore no longer available for matching). In this situation, the relevance-assessing component 118 sets the actual relevance measure to zero (rel=0).

e) Rule 5. This case is similar to Case 4, with the exception of the last assumption. That is, the value of s under consideration is larger than the number of result items in the second ordered set 112 (that is, $s \geq n_{Ref,q}$). Further assume that there is no match between the first-set route item at index value s and any second-set route item. But unlike the above case, there is now a prescribed degree of similarity between the first-set route item at index value s and one or more other second-set route items, including second set-route items that have already received a match. In this situation, the relevance-assessing component 118 designates the actual relevance measure at this index value as "not applicable."

Next, the relevance-assessing component 118 removes all "not applicable" actual relevance measures from the actual relevance information. As a result, the gain-assessing component 120 will not take these removed values into account when calculating the discounted cumulative gain information. In contrast, the actual relevance measures that have been set to zero per cases (b), (c), and (d) will affect the discounted cumulative gain information. Thus, setting an actual relevance measure to zero is not the same as removing it from further analysis. Assume that, as a result of the above operation, the relevance-assessing component 118 provides a set of actual relevance measures.

The relevance-assessing component 118 next computes an ideal relevance measure counterpart to each actual relevance measure. In some implementations, the relevance-assessing component 118 specifically sets each ideal reference measure to ($n_{Ref,q}$−s) for each index value s, assuming that s is less than $n_{Ref,q}$. If the index value s is equal to or greater than $n_{Ref,q}$, then the relevance-assessing component 118 sets the ideal relevance value to the value 1.

In some implementations, the gain-assessing component 120 calculates the actual discounted cumulative gain information ($DCG_{Actual,q}$) by summing the above-described set of actual relevance measures (there being P+1 such measures), discounted by their positions in the ranking, as expressed below by Equation (1).

$$DCG_{Actual,q} = \sum_{i=0}^{P} \frac{rel_i}{\log_2(i+2)}. \quad (1)$$

Similarly, the gain-assessing component 120 calculates the ideal discounted cumulative gain information ($DCG_{Ideal,q}$) by summing the above-described set of ideal relevance measures (there being P+1 such measures), discounted by their positions in the ranking.

$$DCG_{Ideal,q} = \sum_{i=0}^{P} \frac{Rel_i}{\log_2(i+2)}. \quad (2)$$

The first actual relevance measure (at index value i=0) in the set of actual relevance measures retains its full value (without discount) in the sum computed by Equation (1). The same is true for the case of the first ideal relevance measure in the sum computed by Equation (2). This is because this entry is assigned a weight value of $w_0=1/(\log_2(2))=1$. Subsequent relevance measures are discounted at progressively increasing amounts.

In some implementations, the accuracy-assessing component 122 calculates an accuracy measure based on a combination of the actual discounted cumulative gain information and the ideal discounted cumulative gain information, in accordance with Equation (3) below.

$$OSP_q = nDCG_q * 100 = \frac{DCG_{Actual,q}}{DCG_{Ideal,q}} * 100. \quad (3)$$

In other words, the accuracy-assessing component 122 normalizes the actual discounted cumulative gain information by the ideal discounted cumulative gain information. The symbol $OSP_q$ is an acronym for "ordered set parity," and the symbol $nDCG_q$ is an acronym for "normalized discounted cumulative gain." This accuracy measure reflects analysis performed with respect to the result sets generated by a single query q. The accuracy-assessing component 122 can compute accuracy information for an entire set of queries Q, including $\|Q\|$ number of queries, by averaging the individual accuracy measures associated with respective queries in this set, per the following equation:

$$OSP_Q = \frac{1}{\|Q\|} \sum_{q \in Q} OSP_q. \quad (4)$$

The set-wide accuracy information $OSP_Q$ reflects an assessment made based on a consideration of the first ordered set 110 and the second ordered set 112 as respective wholes. It encapsulates, in a single measure, item-to-item differences and ordering differences.

FIGS. 6-9 describe four respective examples of the application of the testing framework 102 to a first ordered set 110 having $n_{Exp}$ route items, and a second ordered set 112 having $n_{Ref}$ route entries. A first (experimental) map engine generates the first ordered set 110, while a second (reference) map engine generates the second ordered set 112. The figures refer to the second-set route items by the acronym "Ref". Further, in the following, so as to simplify the explanation, a first-set route item is referred to as an "experimental" route item, and a second-set route item is referred to as a "reference" route item. The subscript q (for input query q) is omitted in these figures to simplify the explanation.

Figure 6:
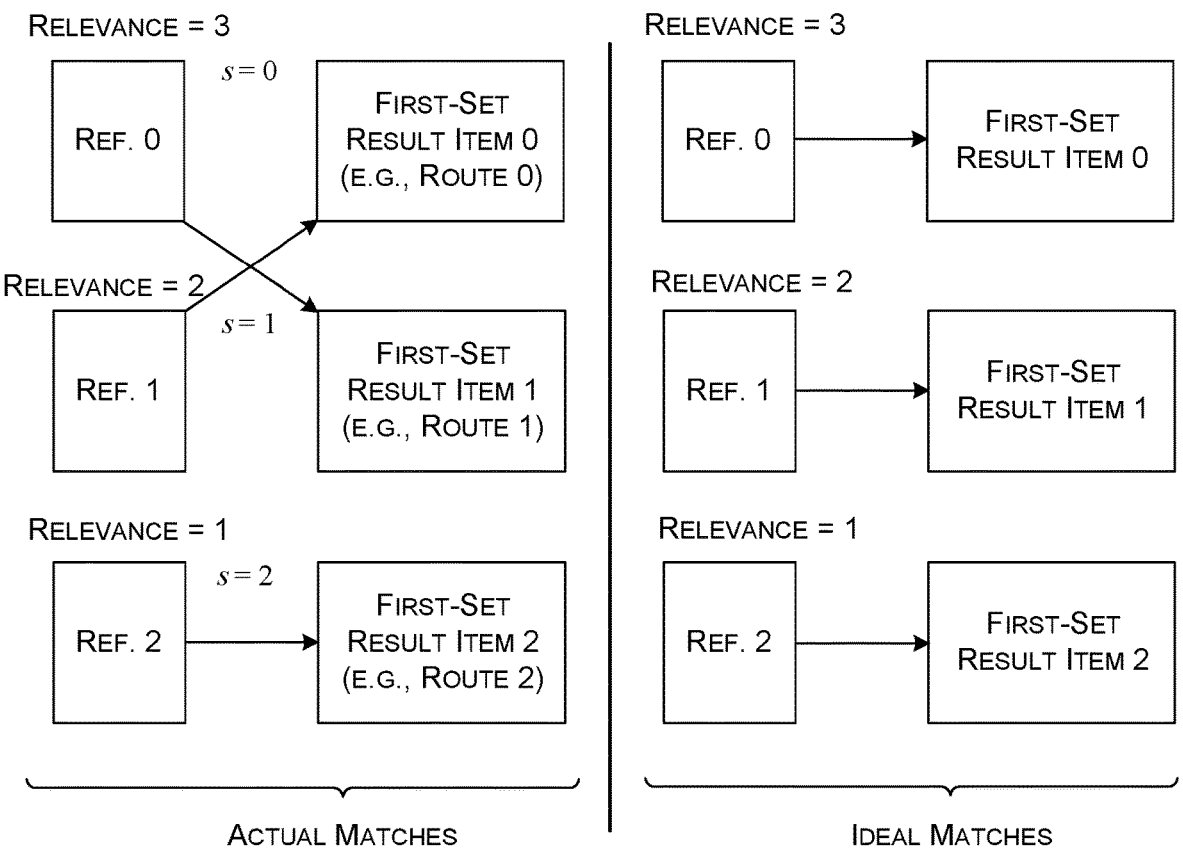

In the first example of FIG. 6, assume that the experimental ordered set 110 and the reference ordered set 112 each have three route items. The matching component 116 begins by successively matching reference route items with unmatched experimental route items. As previously described, the matching component 116 registers a match between a reference route item under consideration and a particular experimental route item when both of these route items express geometrically similar routes (Similarity=1), as assessed based on the prescribed standard of geometric similarity described above. Here, assume that the matching component 116 first determines that the reference route item at a first index value (s=0) matches the experimental route item at index value (s=1). The matching component 116 next determines that the reference route item at index value (s=1) matches the experimental route item at index value (s=0). The matching component 116 next determines that the reference route item at index value (s=2) matches the experimental route item at the same position. For the ideal matches, the matching component 116 indicates that the reference route item at each position should match the experimental route item at the same position.

The relevance-assessing component 118 applies the rules described above to assign the actual relevance measure vector [2, 3, 1] to the experimental route items, indicating that the second experimental route item is the most relevant, the first experimental route item is the second-most relevant route item, and the third experimental route item in the least relevant. The relevance-assessing component 118 assign ideal relevance vector [3, 2, 1] to the experimental route items, corresponding to an ideal ordering of relevance measures. Higher numerical relevance measures convey higher relevance levels.

The top-most table of FIG. 6 is summarized as follows. A first (leftmost) column identifies an index value. Moving to the right, a second column identifies the experimental route item under consideration. A third column identifies the reference route item j that matches each experimental route item under consideration. A fourth column expresses the actual relevance measure (rel=$n_{ref}$−j) for each experimental route item under consideration, and is computed by the relevance-assessing component 118 by applying Rule (1) identified above. A fifth and last column expresses discounted relevance measures 604, which are produced by applying position-dependent weighting factors to the corresponding actual relevance measures in the fourth column. The gain-assessing component 120 computes an actual discounted cumulative gain measure $DCG_{Actual}$ by summing the entries in the last column together. Here, the sum of entries in the last column is (2.00+1.89+0.5=4.39).

The other table shown in FIG. 6 (below the topmost table) has the same entries as the topmost table, but is computed for the ideal matches shown in FIG. 6. For the ideal case, the gain-assessing component 120 computes an ideal discounted cumulative gain measure $DCG_{Ideal}$ as (3.00+1.26+0.5=4.76). The accuracy-assessing component 122 computes an accuracy measure by normalizing the actual discounted cumulative gain information by the ideal discounted cumulative gain information ($OSP=(DCG_{Actual}/DCG_{Ideal})*100=(4.39/4.76)*100=92.2$). Higher OSP measures express higher levels of accuracy in this implementation.

FIG. 7 shows an example in which there are more reference route items in the second ordered set 112 compared to the number of experimental route items in the first ordered set 110. That is, there are three reference route items, whereas there are two experimental route items. The matching component 116 first determines that the reference route item at a first index value (s=0) matches the experimental route item at the same index position (s=0). The matching component 116 next concludes that the reference route item at index value (s=1) has no matching experimental route item. The matching component 116 next determines that the reference route item at index value (s=2) is similar to the experimental route item at the index value (s=1). For the ideal matches, the matching component 116 again indicates that the reference route item at each position should match the experimental route item at the same position.

The relevance-assessing component 118 applies the decision logic described above to assign the actual relevance measure vector [3, 1, 0] to the experimental route items, indicating that the first experimental route item is the most relevant, the second experimental route item is the second-most relevant route item, and the third experimental route item (which is missing) in the least relevant. The relevance-assessing component 118 specifically assigns the relevance value of zero to the third experimental route item because it satisfies Rule (3) set forth above (because here, $s≥n_{Exp}$). The relevance-assessing component 1180 again assigns the ideal relevance vector [3, 2, 1] to the experimental route items, corresponding to an ideal ordering of relevance measures. The tables shown in FIG. 7 are to be interpreted in the same manner as the tables shown in FIG. 6, described above.

The gain-assessing component 120 computes the actual discounted cumulative gain measure as (3.00+0.63+0.00=3.63), and the ideal discounted cumulative gain measure as (3.00+1.26+0.50=4.76). The accuracy-assessing component computes the accuracy measure by normalizing the actual discounted cumulative gain measure by the ideal discounted cumulative gain measure (OSP=(3.63/4.76)*100=76.3). The accuracy measure for this example is less than the accuracy measure for the example of FIG. 6, indicating that the experimental route items are considered less accurate compared to the experimental ordered set described in FIG. 6.

FIG. 8 shows an example in which there are more experimental route items in the first ordered set 110 compared to the number of reference route items in the second ordered set 112. That is, there are three experimental route items, whereas there are two reference route items. The matching component 116 first determines that the reference route item at a first index value (s=0) matches the experimental route item at the same index position (s=0). The matching component 116 next determines that the reference route item at index value (s=1) also matches the experimental route item at the same index position (s=1). There is no reference route item at the index value (s=2). Further, assume that the matching component 116 concludes that the "extra" experimental route item at position (s=2) is similar to one or more of the existing reference route items (e.g., at positions s=0 and/or s=1), which have here already been paired with other experimental route items. For the ideal matches, the matching component 116 again indicates that the experimental route items at the (s=0) and (s=1) positions should match their corresponding reference route items at the same position. The matching component 116 declines to make an ideal match for the experimental route item at position (s=2), since this "extra" route item has been determined to be likely redundant, and not of consequence in calculating the discounted cumulative gain information.

The relevance-assessing component 118 applies the decision logic described above to assign the actual relevance measure vector [2, 1] to the experimental route items, indicating that the first experimental route item is the most relevant, and the second experimental route item is the second-most relevant route item. By applying Rule (5) described above, the relevance-assessing component 118 assesses the entry for position s=2 as "not relevant," and, in response, removes it from the actual relevance measure vector. The relevance-assessing component 118 computes the same ideal relevance vector [2, 1] to express the relevance of the ideal matches. The tables shown in FIG. 8 are to be interpreted in the same manner as the tables shown in FIG. 6, describe above The gain-assessing component 120 computes the actual discounted cumulative gain measure as (2.00+0.63=2.63), and the ideal discounted cumulative gain measure as (2.00+0.63=2.63). The accuracy-assessing component 122 computes the accuracy measure by normalizing the actual discounted cumulative gain measure by the ideal discounted cumulative gain measure (OSP=(2.63/2.63)*100=100). Thus, the accuracy-assessing component 122 assigns the highest accuracy measure to this case because the first two experimental route items match reference route items at the same respective positions, and third experimental route item is ignored because it is deemed as conveying redundant (but still relevant) route information.

FIG. 9 shows an example which is the same as the example of FIG. 8 (there being three experimental route items, but only two reference route items). Further, assume that the matching component 116 matches the first two reference route items (at positions s=0 and s=1) to experimental route items at the same positions. But this case is different because the matching component 116 concludes that the "extra" experimental route item at position (s=2) no longer has similarity with any of the existing reference route items. In other words, the matching component 116 indicates that the extra experimental route item is not redundant, but likely provides erroneous route information. For the ideal matches, the matching component 116 indicates that the first two reference route items at positions (s=0) and (s=1) match corresponding experimental route items at the same position. To penalize the inclusion of likely erroneous experimental route item at position (s=2), the matching component 116 designates that there is no reference route item for this position (s=2).

The relevance-assessing component 118 applies the decision logic described above to assign the actual relevance measure vector [2, 1, 0] to the experimental route items, indicating that the first experimental route item is the most relevant, the second experimental route item is the second-most relevant route item, and the third experimental route item (which is extra) is not relevant at all. The relevance-assessing component 118 specifically assigns the relevance value of zero to the third experimental route item because it satisfies Rule (4) set forth above. The relevance-assessing component 118 assigns the ideal relevance vector [2, 1, 1] to the experimental route items, corresponding to an ideal ordering of relevance measures. The relevance-assessing component 118 specifically assigns the value of 1 to the third position because the conditions $s \geq n_{Ref}$ is satisfied. The tables shown in FIG. 9 are to be interpreted in the same manner as the tables shown in FIG. 6, described above.

The gain-assessing component 120 computes the actual discounted cumulative gain measure as (2.00+0.63+0.00=2.63), and the ideal discounted cumulative gain measure as (2.00+0.63+0.50=3.13). The accuracy-assessing component 122 computes the accuracy measure by normalizing the actual discounted cumulative gain measure by the ideal discounted cumulative gain measure ((2.63/3.13) *100=84.0). The accuracy measure for this example is less than the accuracy measure for the example of FIG. 7, indicating that the experimental ordered set has now been penalized for the inclusion of an extra irrelevant route item (whereas the extra experimental route item in the example of FIG. 8 was deemed relevant yet redundant).

B. Illustrative Processes

FIG. 10-13 show illustrative processes that explain the operation of the functionality of Section A in flowchart form. Since the principles underlying the operation of the functionality have already been described in Section A, certain operations will be addressed in summary fashion in this section. Each flowchart is expressed as a series of operations performed in a particular order. But the order of these operations is merely representative, and varies in other implementations. Further, any two or more operations described below is capable of being performed in a parallel manner. In one implementation, the blocks shown in the flowcharts that pertain to processing-related functions are implemented by the hardware logic circuitry described in Section C, which, in turn, includes one or more processors and/or other logic units that include a task-specific collection of logic gates.

FIG. 10 shows a process 1002 performed by the testing framework 102 for updating data-processing functionality. In block 1004, the testing framework 102 obtains the first ordered set 110 of first-set result items produced by the first data-processing engine 104 in response to an input query. In block 1006, the testing framework 102 obtains the second ordered set 112 of second-set result items produced by the second data-processing engine 106 in response to the same input query, the second data-processing engine 106 serving as a reference engine that provides ground-truth result items. In block 1008, the testing framework 102 generates accuracy information by assessing accuracy of the first-set result items relative to the second-set result items. The generating operation of block 1006 is based on an assessment of item similarity between individual pairings formed from the first ordered set 110 and the second ordered set 112, and based on a comparison of an order of the first-set result items and an order of the second-set result items. In block 1010, the testing framework 102 produces output information that identifies deficiencies in the first data-processing engine 104 based on the accuracy information, which enables modification of the configuration of the first data-processing engine 104 to increase quality of result items produced by the first data-processing engine in a production stage of operation.

FIG. 11 shows a process 1102 that provides illustrative details regarding operation 1008 of FIG. 10. In block 1104, the testing framework 102 produces matching information by using a prescribed test of similarity to identify first-set result items that match respective second-set result items. In block 1106, the testing framework 102 determines relevance information based on the matching information, the relevance information including individual relevance measures that express relevance of respective first-set result items in the first ordered set 110. In block 1108, the testing framework 102 produces discounted cumulative gain information based on an aggregation of the relevance measures produced by the determining operation (of block 1106). In block 1110, the testing framework 102 produces the accuracy information based on the discounted cumulative gain information.

FIG. 12 shows a process 1202 that represents the application of the processes (1002, 1102) of FIGS. 10 and 11 to fine-tuning the first data-processing engine 104. In block 1204, the testing framework 102 obtains a first ordered set 110 of first-set route items produced by a first map engine (e.g., the first data-processing engine 104) in response to submission of an input query. In block 1206, the testing framework 102 obtains a second ordered set 112 of second-set route items produced by the second map engine (e.g., the second data-processing engine 106) in response to the same input query, the second map engine serving as a reference engine that provides ground-truth result items. In block 1208, the testing framework 102 produces matching information by using a prescribed test of geometric similarity to identify first-set route items that match respective second-set route items. In block 1210, the testing framework 102 determines relevance information based on the matching information, the relevance information including individual relevance measures that express relevance of respective first-set route items in the first ordered set 110. In block 1212, the testing framework 102 produces discounted cumulative gain information based on an aggregation of the relevance measures produced by the determining (of block 1210). In block 1214, the testing framework 102 produces accuracy information based on the discounted cumulative gain information, the accuracy information expressing an extent to which the first map engine (e.g., the first data-processing engine 104) produces route suggestions that are accurate and correctly ordered. In block 1216, the testing framework 102 identifies deficiencies in the first map engine based on the accuracy information.

FIG. 13 shows a process 1302 performed by a map engine 302 for assisting in navigation over a physical space. In block 1304, the map engine 302 receives an input query that specifies a starting location and an ending location in the physical space. In block 1306, the map engine 302 identifies one or more candidate routes based on the input query, each of the candidate routes specifying a candidate path between the starting location and the ending location. In block 1308, the map engine 302 generates output results that enable navigation along a selected candidate path, chosen from among the one or more candidate routes.

C. Representative Computing Functionality

Figure 14:
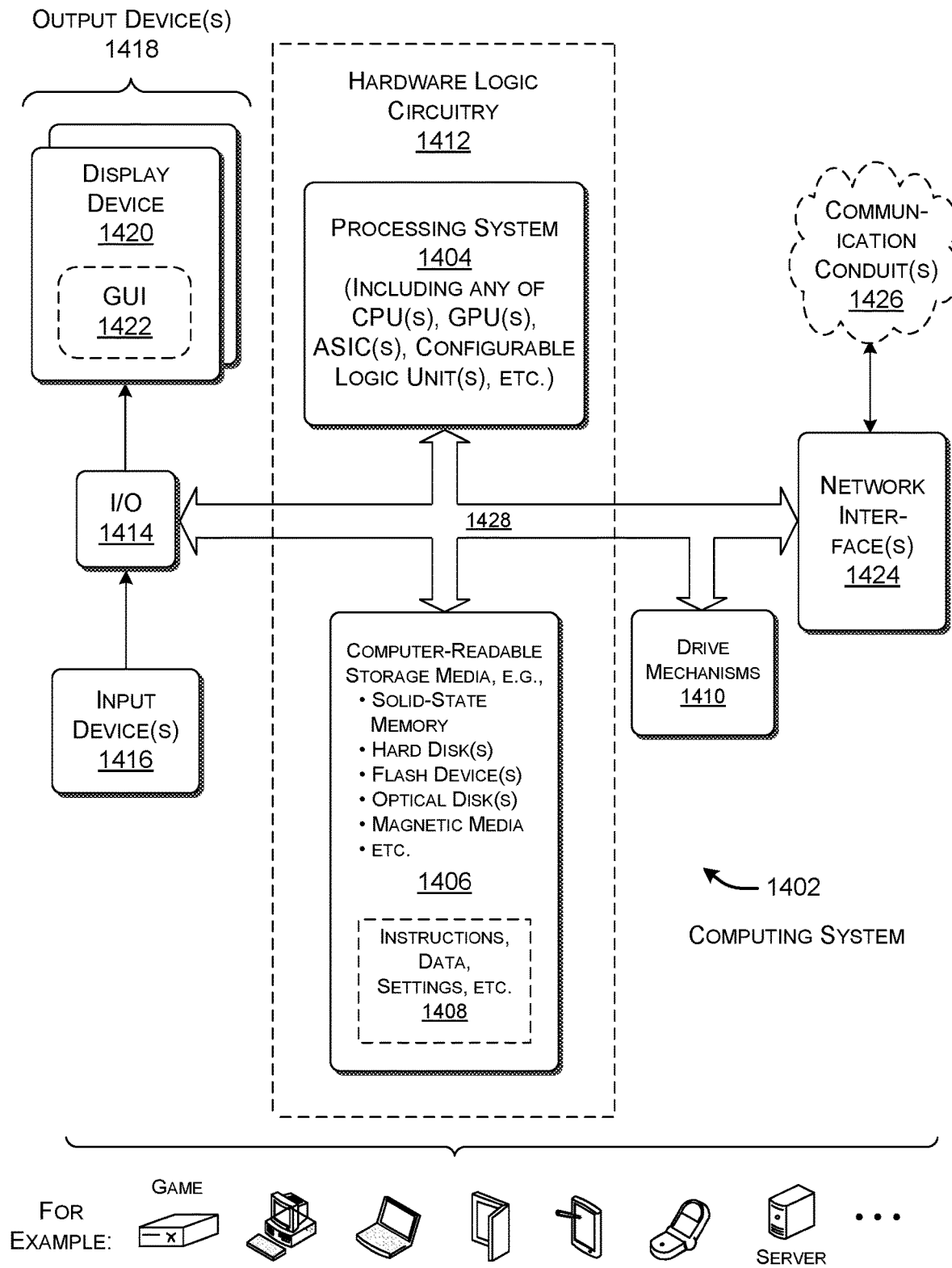
FIG. 14 shows an illustrative type of computing system that, in some implementations, is used to implement any aspect of the features shown in the foregoing drawings.

FIG. 14 shows a computing system 1402 that, in some implementations, is used to implement any aspect of the mechanisms set forth in the above-described figures. For instance, in some implementations, the type of computing system 1402 shown in FIG. 14 is used to implement any user computing device or any server shown in FIG. 4. In all cases, the computing system 1402 represents a physical and tangible processing mechanism.

The computing system 1402 includes a processing system 1404 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1402 also includes computer-readable storage media 1406, corresponding to one or more computer-readable media hardware units. The computer-readable storage media 1406 retains any kind of information 1408, such as machine-readable instructions, settings, and/or data. For example, in some implementations, the computer-readable storage media 1406 includes one or more solid-state devices, one or more magnetic hard disks, one or more optical disks, magnetic tape, etc. Any instance of the computer-readable storage media 1406 uses any technology for storing and retrieving information. Further, any instance of the computer-readable storage media 1406 represents a fixed or removable unit of the computing system 1402. Further, any instance of the computer-readable storage media 1406 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals in transit.

The computing system 1402 utilizes any instance of the computer-readable storage media 1406 in different ways. For example, in some implementations, any instance of the computer-readable storage media 1406 represents a hardware memory unit (such as Random Access Memory (RAM)) for storing information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

In some implementations, the computing system 1402 performs any of the functions described above when the processing system 1404 executes computer-readable instructions stored in any instance of the computer-readable storage media 1406. For instance, in some implementations, the computing system 1402 carries out computer-readable instructions to perform each block of the processes described in Section B. FIG. 14 generally indicates that hardware logic circuitry 1412 includes any combination of the processing system 1404 and the computer-readable storage media 1406.

In addition, or alternatively, the processing system 1404 includes one or more other configurable logic units that perform operations using a collection of logic gates. For instance, in some implementations, the processing system 1404 includes a fixed configuration of hardware logic gates, e.g., that are created and set at the time of manufacture, and thereafter unalterable. In addition, or alternatively, the processing system 1404 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 1404 effectively incorporates a storage device that stores computer-readable instructions, insofar as the configurable logic units are configured to execute the instructions and therefore embody or store these instructions.

In some cases (e.g., in the case in which the computing system 1402 represents a user computing device), the computing system 1402 also includes an input/output interface 1414 for receiving various inputs (via input devices 1416), and for providing various outputs (via output devices 1418). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1420 and an associated graphical user interface presentation (GUI) 1422. The display device 1420 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1402 also includes one or more network interfaces 1424 for exchanging data with other devices via one or more communication conduits 1426. One or more communication buses 1428 communicatively couple the above-described units together.

The communication conduit(s) 1426 is capable of being implemented in any manner, e.g., by a local area computer network, a wide area computer network (e.g., the Internet), point-to-point connections, or any combination thereof. The communication conduit(s) 1426 includes any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 includes a hardware logic unit that integrates the functions of two or more of the units shown in FIG. 1. For instance, in some implementations, the computing system 1402 includes a system on a chip (SoC or SOC), corresponding to an integrated circuit that combines the functions of two or more of the units shown in FIG. 14.

The following summary provides a set of illustrative examples of the technology set forth herein.

(A1) According to a first aspect, a method (e.g., 1002) is described updating data-processing functionality. The method includes: obtaining (e.g., 1004) a first ordered set (e.g., 110) of first-set result items produced by a first data-processing engine (e.g., 104) in response to an input query; obtaining (e.g., 1006) a second ordered set (e.g., 112) of second-set result items produced by a second data-processing engine (e.g., 1006) in response to the same input query, the second data-processing engine serving as a reference engine that provides ground-truth result items; and generating (e.g., 1008) accuracy information by assessing accuracy of the first-set result items relative to the second-set result items. The generating is specifically based on an assessment of item similarity between individual pairings formed from the first ordered set and the second ordered set, and based on a comparison of an order of the first-set result items and an order of the second-set result items. The method further includes producing (e.g., 1010) output information that identifies deficiencies in the first data-processing engine based on the accuracy information, which enables modification of a configuration of the first data-processing engine to increase quality of result items produced by the first data-processing engine in a production stage of operation.

(A2) According to some implementations of the method of A1, the first-set result items and the second-set result items describe suggestions that are generated based on query information specified in the input query.

(A3) According to some implementations of the method of A2, the query information describes a starting location and an ending location, and the suggestions are candidate routes between the starting location and the ending location.

(A4) According to some implementations of the method of A2, the query information specifies one or more words, and the suggestions are transformations of the one or more words.

(A5) According to some implementations of the method of A2, the query information specifies a topic, and the suggestions are recommendations pertaining to the topic.

(A6) According to some implementations of any of the methods of A1-A5, in the production stage of operation, the first data-processing engine and/or the second data-processing engine operate by processing user queries submitted over a wide-area network.

(A7) According to some implementations of any of the methods of A1-6, the generating includes: producing matching information that uses a prescribed test of similarity to identify first-set result items that match respective second-set result items; determining relevance information based on the matching information, the relevance information including individual relevance measures that express relevance of respective first-set result items in the first ordered set; producing discounted cumulative gain information based on an aggregation of the relevance measures produced by the determining; and producing the accuracy information based on the discounted cumulative gain information.

(A8) According to some implementations of the method of A7, the producing matching information operates by processing each second-set result item in a same order as the order of the second-set result items in the second ordered set. Further, the producing matching information includes, for each candidate second-set result item, matching the candidate second-set result item with a first-occurring unmatched first-set result item that is assessed as matching the candidate second-set result item, based on the prescribed test of similarity.

(A9) According to some implementations of the method of A7, in one case, a particular first-set result item matches a particular second-set result item, and the determining relevance information assigns a relevance measure to the particular first-set result item based on a position of the particular second-set result item in the second ordered set.

(A10) According to some implementations of the method of A7, in one case, a particular first-set result item does not match any second-set result item in the second ordered set, and the determining relevance information assigns a relevance measure to the particular first-set result item that conveys that the particular first-set result item is not relevant.

(A11) According to some implementations of the method of A7, the relevance measures in the relevance information have a particular order, and the discounted cumulative gain information discounts contributions from the relevance measures based on positions of the relevance measures in the particular order.

(A12) According to some implementations of the method of A7, the relevance information includes: actual relevance information that expresses relevance of the first-set result items in an actual order of the first-set result items as given, as assessed against the second ordered set; and ideal relevance information that expresses relevance of the first-set result items based on an expectation that more relevant first-set result items should be ranked more favorably than less relevant first-set result items.

(A13) According to some implementations of the method of A12, the discounted cumulative gain information includes: actual discounted cumulative gain information that is produced based on the actual relevance information; and ideal discounted cumulative gain information that is produced based on the ideal relevance information.

(A14) According to some implementations of the method of A13, the producing accuracy information involves normalizing the actual discounted cumulative gain information by the ideal discounted cumulative gain information.

(A15) According to some implementations of any of the methods of A1-A14, the method further includes automatically changing the configuration of the first data-processing engine based on the output information.

(B1) According to a second aspect, another method (e.g., 1002) is described for updating a first map engine (e.g., 104). The method includes: obtaining (e.g., 1204) a first ordered set (e.g., 110) of first-set route items produced by the first map engine in response to submission of an input query; obtaining (e.g., 1206) a second ordered set (e.g., 112) of second-set route items produced by a second map engine (e.g., 106) in response to the same input query, the second map engine serving as a reference engine that provides ground-truth route items; producing (1208) matching information by using a prescribed test of geometric similarity to identify first-set route items that match respective second-set route items; determining (e.g., 1210) relevance information based on the matching information, the relevance information including individual relevance measures that express relevance of respective first-set route items in the first ordered set; producing (e.g., 1212) discounted cumulative gain information based on an aggregation of the relevance measures produced by the determining; producing (e.g., 1214) accuracy information based on the discounted cumulative gain information, the accuracy information expressing an extent to which the first map engine produces route suggestions that are accurate and correctly ordered; and identifying (1216) deficiencies in the first map engine based on the accuracy information, and expressing the deficiencies in output information.

(B2) According to some implementations of the method of B1, the input query describes a starting location and an ending location, and each first-set route item and each second-set route item specifies a candidate route between the starting location and the ending location.

(B3) According to some implementations of any of the methods of B1 or B2, in a production stage of operation, the first map engine performs a route-finding process based on a starting location determined by an automated position-determining system.

(B4) According to some implementations of any of the methods of B1-B3, the prescribed test of geometric similarity determines an extent of geometric similarity between a particular second-set route item and a particular first-set route item based on: route lengths of the particular first-set route item and the particular second-set route item; and a metric that assesses a separation between the particular first-set route item and the particular second-set route item, over a course of trajectories defined by the first-set route item and the second-set route item.

(B5) According to some implementations of any of the methods of B1-B4, the producing matching information operates by processing each second-set route item in a same order as an order of the second-set route items in the second ordered set. Further, the producing matching information includes, for each candidate second-set route item, matching the candidate second-set route item with a first-occurring unmatched first-set route item that is assessed as matching the candidate second-set route item, based on the prescribed test of similarity.

(B6) According to some implementations of the method of B5, in one case, a particular first-set route item matches a particular second-set route item, and the determining relevance information assigns a relevance measure to the particular first-set route item based on a position of the particular second-set route item in the second ordered set.

(B7) According to some implementations of the method of B5, in one case, a particular first-set route item does not match any second-set route item in the second ordered set, and the determining relevance information assigns a relevance measure to the particular first-set route item that conveys that the particular first-set route item is not relevant.

(B8) According to some implementations of any of the methods of B1-B7, the relevance measures in the relevance information have a particular order, and the discounted cumulative gain information discounts contributions from the relevance measures based on positions of the relevance measures in the particular order.

(B9) According to some implementations of the method of B1, the relevance information includes: actual relevance information that expresses relevance of the first-set route items in an actual order of the first-set route items as given, as assessed against the second ordered set; and ideal relevance information that expresses relevance of the first-set route items based on an expectation that more relevant first-set route items should be ranked more favorably than less relevant first-set route items.

(B10) According to some implementations of the method of B9, the discounted cumulative gain information includes: actual discounted cumulative gain information that is produced based on the actual relevance information; and ideal discounted cumulative gain information that is produced based on the ideal relevance information.

(B11) According to some implementations of the method of B10, the producing accuracy information involves normalizing the actual discounted cumulative gain information by the ideal discounted cumulative gain information.

(B12) According to some implementations of any of the methods of B1-B11, the method further includes changing the configuration of the first map engine based on the output information. The changing involves, for instance, modifying map data in a map database on which the first map engine relies, and/or modifying map logic used by the first map engine to choose candidate route items.

(B13) According to some implementations of the method of B1-B12, in a production stage of operation, the first map engine performs a route-finding process that includes: receiving a production-stage input query that specifies a starting location and an ending location in physical space; identifying one or more candidate routes based on the production-stage input query, each of the candidate routes specifying a candidate path between the starting location and the ending location; and generating output results that enable navigation along a selected candidate route, chosen from among the one or more candidate routes.

(C1) According to a third aspect, a computing system (e.g., 1402) for assisting in navigation over a physical space is described. The computing system includes a first map engine (e.g., 302) having a first processing system (e.g., 1404) that executes machine-readable instructions (e.g., 1408) to perform a route-finding process (e.g., 1302). The route-finding process includes: receiving (e.g., 1304) an input query that specifies a starting location and an ending location in the physical space; identifying (e.g., 1306) one or more candidate routes based on the input query, each of the candidate routes specifying a candidate path between the starting location and the ending location; and generating (e.g., 1308) output results that enable navigation along a selected candidate route, chosen from among the one or more candidate routes. The computing system also includes a testing framework (e.g., 102) having a second processing system (e.g., 1404) for executing computer-readable instructions (e.g., 1408) to perform an updating process (e.g., 1002) for a plurality of test input queries.

The updating process includes, for a particular test input query in the plurality of test input queries: obtaining (e.g., 1004) a first ordered set (e.g., 110) of first-set route items produced by the first map engine (e.g., 302) in response to submission of the particular test input query; obtaining (e.g., 1006) a second ordered set (e.g., 112) of second-set route items produced by a second map engine (e.g., 106) in response to the same particular test input query, the second map engine serving as a reference engine that provides ground-truth route items; and generating (e.g., 1008) accuracy information by assessing accuracy of the first-set route items relative to the second-set route items. The generating is based on an assessment of geometric similarity between individual pairings formed from the first ordered set and the second ordered set, and based on a comparison of an order of the first-set route items and an order of the second-set route items. The updating process further includes producing (e.g., 1010) output information that identifies deficiencies in the first map engine based on the accuracy information, which enables modification of a configuration of the first map engine to increase quality of route items produced by the first map engine.

(C2) According to some implementations of the computing system of C1, the starting location specified in the route-finding process is determined by an automated position-determining system based on an identified current location.

In yet another aspect, some implementations of the technology described herein include a computing system (e.g., the computing system 1402) that includes a processing system (e.g., the processing system 1404) having a processor. The computing system also includes a storage device (e.g., the computer-readable storage media 1406) for storing computer-readable instructions (e.g., information 1408) that, when executed by the processing system, perform any of the methods described herein (e.g., any of the methods of A1-A15 or B1-B13).

In yet another aspect, some implementations of the technology described herein include a computer-readable storage medium (e.g., the computer-readable storage media 1406) for storing computer-readable instructions (e.g., the information 1408). A processing system (e.g., the processing system 1404) executes the computer-readable instructions to perform any of the operations described herein (e.g., the operation in any of the methods of A1-A15 or B1-B13).

More generally stated, any of the individual elements and steps described herein are combinable, for example, into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1412 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

As to specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of," is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. A "set" includes zero members, one member, or more than one member. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for updating data-processing functionality, comprising:
   obtaining a first ordered set of first-set result items produced by a first data-processing engine in response to an input query;
   obtaining a second ordered set of second-set result items produced by a second data-processing engine in response to the same input query, the second data-processing engine serving as a reference engine that provides ground-truth result items;
   generating accuracy information by assessing accuracy of the first-set result items relative to the second-set result items,
   the generating being based on an assessment of item similarity between individual pairings formed from the first ordered set and the second ordered set, and based on a comparison of an order of the first-set result items and an order of the second-set result items; and
   producing output information that identifies deficiencies in the first data-processing engine based on the accuracy information, which enables modification of a configuration of the first data-processing engine to increase quality of result items produced by the first data-processing engine in a production stage of operation,
   the generating including:
   producing matching information that uses a prescribed test of similarity to identify first-set result items that match respective second-set result items; and
   determining relevance information based on the matching information, the relevance information including individual relevance measures that express relevance of respective first-set result items in the first ordered set,
   wherein a particular first-set result item matches a particular second-set result item, and wherein the determining relevance information assigns a relevance measure to the particular first-set result item based on a position of the particular second-set result item in the second ordered set.

2. The computer-implemented method of claim 1, wherein the first-set result items and the second-set result items describe suggestions that are generated based on query information specified in the input query.

3. The computer-implemented method of claim 2, wherein the query information describes a starting location and an ending location, and wherein the suggestions are candidate routes between the starting location and the ending location.

4. The computer-implemented method of claim 2,
wherein the query information specifies one or more words, and the suggestions are transformations of the one or more words, or
wherein the query information specifies a topic, and the suggestions are recommendations pertaining to the topic.

5. The computer-implemented method of claim 1, wherein, in the production stage of operation, the first data-processing engine and/or the second data-processing engine operate by processing user queries submitted over a wide-area network.

6. The computer-implemented method of claim 1, wherein the generating also includes:
producing discounted cumulative gain information based on an aggregation of the relevance measures produced by the determining; and
producing the accuracy information based on the discounted cumulative gain information.

7. The computer-implemented method of claim 6, wherein the relevance measures in the relevance information have a particular order, and wherein the discounted cumulative gain information discounts contributions from the relevance measures based on positions of the relevance measures in the particular order.

8. The computer-implemented method of claim 1,
wherein the producing matching information operates by processing each second-set result item in a same order as the order of the second-set result items in the second ordered set, and
wherein the producing matching information includes, for each candidate second-set result item, matching the candidate second-set result item with a first-occurring unmatched first-set result item that is assessed as matching the candidate second-set result item, based on the prescribed test of similarity.

9. The computer-implemented method of claim 1, wherein another particular first-set result item does not match any second-set result item in the second ordered set, and wherein the determining relevance information assigns a relevance measure to said another particular first-set result item that conveys that said another particular first-set result item is not relevant.

10. The computer-implemented method of claim 1, wherein the relevance information includes:
actual relevance information that expresses relevance of the first-set result items in an actual order of the first-set result items as given, as assessed against the second ordered set; and
ideal relevance information that expresses relevance of the first-set result items based on an expectation that more relevant first-set result items should be ranked more favorably than less relevant first-set result items.

11. The computer-implemented method of claim 10, wherein the discounted cumulative gain information includes:
actual discounted cumulative gain information that is produced based on the actual relevance information; and
ideal discounted cumulative gain information that is produced based on the ideal relevance information.

12. The computer-implemented method of claim 11, wherein the producing accuracy information involves normalizing the actual discounted cumulative gain information by the ideal discounted cumulative gain information.

13. The computer-implemented method of claim 1, further including automatically changing the configuration of the first data-processing engine based on the output information.

14. The computer-implemented method of claim 1,
wherein the first data-processing engine is a first map engine, and the first ordered set of first-set result items is a first ordered set of first-set route items produced by the first map engine,
wherein the second data-processing engine is a second map engine, and the second ordered set of second-set result items is a second ordered set of second-set route items produced by the second map engine.

15. The computer-implemented method of claim 14,
wherein the generating includes producing matching information that uses a prescribed test of similarity to identify first-set route items that match respective second-set route items,
wherein the prescribed test of similarity determines an extent of geometric similarity between a particular second-set route item and a particular first-set route item based on:
route lengths of the particular first-set route item and the particular second-set route item; and
a metric that assesses a separation between the particular first-set route item and the particular second-set route item, over a course of trajectories defined by the particular first-set route item and the particular second-set route item.

16. The computer-implemented method of claim 14, further including changing a configuration of the first map engine based on the output information by correcting a map database used by the first map engine.

17. The computer-implemented method of claim 14, further including changing a configuration of the first map engine based on the output information by training operation of the first map engine.

18. A computing system for updating data-processing functionality, comprising:
a memory for storing machine-readable instructions; and
a processing system that executes the machine-readable instructions to perform operations of:
obtaining a first ordered set of first-set result items produced by a first data-processing engine in response to an input query;
obtaining a second ordered set of second-set result items produced by a second data-processing engine in response to the same input query, the second data-processing engine serving as a reference engine that provides ground-truth result items;
generating accuracy information by assessing accuracy of the first-set result items relative to the second-set result items,
the generating being based on an assessment of item similarity between individual pairings formed from the first ordered set and the second ordered set, and based on a comparison of an order of the first-set result items and an order of the second-set result items; and
producing output information that identifies deficiencies in the first data-processing engine based on the accuracy information, which enables modification of a configuration of the first data-processing engine to increase quality of result items produced by the first data-processing engine in a production stage of operation, wherein the generating includes:

producing matching information that uses a prescribed test of similarity to identify first-set result items that match respective second-set result items;

determining relevance information based on the matching information, the relevance information including individual relevance measures that express relevance of respective first-set result items in the first ordered set;

producing discounted cumulative gain information based on an aggregation of the relevance measures produced by the determining; and producing the accuracy information based on the discounted cumulative gain information.

19. A computer-readable storage medium for storing computer-readable instructions, the computer-readable memory excluding propagated signals in transit, wherein a processing system executing the computer-readable instructions performs operations comprising:

obtaining a first ordered set of first-set result items produced by a first data-processing engine in response to an input query;

obtaining a second ordered set of second-set result items produced by a second data-processing engine in response to the same input query, the second data-processing engine serving as a reference engine that provides ground-truth result items;

generating accuracy information by assessing accuracy of the first-set result items relative to the second-set result items, the generating being based on an assessment of item similarity between individual pairings formed from the first ordered set and the second ordered set, and based on a comparison of an order of the first-set result items and an order of the second-set result items; and producing output information that identifies deficiencies in the first data-processing engine based on the accuracy information, which enables modification of a configuration of the first data-processing engine to increase quality of result items produced by the first data-processing engine in a production stage of operation, wherein the generating includes:

producing matching information that uses a prescribed test of similarity to identify first-set result items that match respective second-set result items;

determining relevance information based on the matching information, the relevance information including individual relevance measures that express relevance of respective first-set result items in the first ordered set;

producing discounted cumulative gain information based on an aggregation of the relevance measures produced by the determining; and producing the accuracy information based on the discounted cumulative gain information.

* * * * *